United States Patent [19]

Matsuda

[11] Patent Number: 5,014,809
[45] Date of Patent: May 14, 1991

[54] DRIVING TORQUE DISTRIBUTION CONTROL SYSTEM FOR 4WD VEHICLE

[75] Inventor: Toshiro Matsuda, Sagamihara City, Japan

[73] Assignee: Nissan Motor Co., Ltd., Yokohama City, Japan

[21] Appl. No.: 400,536

[22] Filed: Aug. 31, 1989

[30] Foreign Application Priority Data

Aug. 31, 1988 [JP] Japan .................. 63-217743

[51] Int. Cl.[5] .......................... B60K 17/344
[52] U.S. Cl. .................... 180/248; 180/197; 180/233; 364/426.03
[58] Field of Search ............ 180/248, 233, 140, 197; 364/426.02, 426.03, 424.03; 74/665 T

[56] References Cited

U.S. PATENT DOCUMENTS

| | | | |
|---|---|---|---|
| 4,754,834 | 7/1988 | Ozaki et al. | 180/233 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,846,298 | 7/1989 | Naito | 180/233 |
| 4,966,250 | 10/1990 | Imaseki | 180/233 |

FOREIGN PATENT DOCUMENTS 61-249859 11/1986 Japan .

Primary Examiner—David M. Mitchell
Attorney, Agent, or Firm—Foley & Lardner

[57] ABSTRACT

A control system for a 4WD vehicle includes a transfer clutch capable of continuously varying a driving torque distribution ratio between front and rear axles, and a controller for producing a control signal to control the distribution ratio. In order to improve the stability of the vehicle during deceleration, the control system is provided with a sensor for sensing one or more of an engine speed, a throttle opening, a transmission gear ratio, a vehicle speed and other vehicle operating parameters affecting engine braking, and a controller section for controlling the distribution ratio in accordance with the amount of engine braking at a level which is higher enough than the level of 2WD to adequately distribute the engine braking force between the front and rear axles and which is lower enough than the 4WD level to allow the front and rear axles to rotate at different speeds.

20 Claims, 14 Drawing Sheets

DRIVING TORQUE DISTRIBUTION CONTROL SYSTEM FOR 4WD VEHICLE

REFERENCES TO RELATED CASES

The following, commonly assigned United States Patents and Applications relates to driving force distribution control systems similar to that of the present invention.

(1) U.S. Pat. No. 4,757,870; (2) U.S. Pat. No. 4,754,834; (3) U.S. Pat. No. 4,773,500; (4) U.S. Pat. No. 4,776,424; (5) U.S. application Ser. No. 07/127,319; filed Dec. 2, 1987; now U.S. Pat. No. 4,874,056 (6) U.S. application Ser. No. 07/277,746; filed Nov. 30, 1988; now U.S. Pat. No. 4,887,689 (7) U.S. application Ser. No. 07/254,626; filed Oct. 7, 1988; now U.S. Pat. No. 4,846,298 (8) U.S. application Ser. No. 07/254,875; filed Oct. 7, 1988; now U.S. Pat. No. 4,941,541 (9) U.S. application Ser. No. 07/255,820; filed Oct. 11, 1988; now U.S. Pat. No. 4,966,250 (10) U.S. application Ser. No. 07/277,377; filed Nov. 29, 1988; now U.S. Pat. No. 4,890,685 (11) U.S. application Ser. No. 07/255,939; filed Oct. 11, 1988; now U.S. Pat. No. 4,966,249 and (12) U.S. application Ser. No. 07/400,538 filed concurrently with this application, based on Japanese Patent Application No. 63-217744.

BACKGROUND OF THE INVENTION

The present invention relates to a driving torque (or driving force) distribution control system for a four wheel driving vehicle, and more specifically to a driving torque distribution control system which can ensure the stability of the vehicle by distributing an engine braking force between the front and rear axles during deceleration.

Japanese Patent Provisional Publication No. 61-249859 discloses a vehicle having a 4 WD system and an antiskid brake control system. The 4 WD system of this conventional example has a transfer clutch for switching the drive system from the 2 WD state to the 4 WD state or vice versa. When the brakes are applied, the transfer cltuch is disengaged to disconnect the front wheels from the engine and to bring the drive system to the 2 WD state, and the antiskid brake control system controls the brake of each wheel by using the wheel speed of the undriven front wheels in order to maintain reliable and correct performance of the antiskid brake control without receiving undesired influences of change in torque of the engine and change in rotational inertia due to transmission gear shifting.

In the 4 WD state, the front and rear wheel speeds are synchronized, and the inertia of each wheel is great, so that changes of the wheel speeds become small, and it becomes difficult to determine a quasi vehicle speed from the wheel speeds. This is the reason why the conventional 4 WD system is changed from the 4 WD state to the 2 WD state when the vehicle comes into a decelerating condition or the antiskid control system comes into operation.

However, in the 2 WD state, all the force of engine braking is applied only to the rear wheels. Therefore, the rear wheel speed decreases too much below the front wheel speed, and the rear wheel cornering force becomes lower, so that the tendency to spin of the vehicle is increased especially on a road of a low friction coefficient, such as a road covered with snow or ice, or wetted with rain. If the drive system is put in the 2 WD state in which only the front wheels are driven by the engine, the front wheel cornering force becomes so low that the tendency to drift-out is increased. In either case, the behavior of the 4 WD vehicle becomes unstable during deceleration.

SUMMARY OF THE INVENTION

It is therefore an object of the present invention to provide a driving torque distribution control system which can maintain the stability of the 4 WD vehicle even during deceleration.

According to the present invention, a driving force (torque) distribution control system for a vehicle, comprises an actuator means for varying a driving force distribution ratio which is a ratio of a driving force transmitted from an engine of the vehicle to secondary driving wheels of the vehicle to a driving force transmitted from the engine to primary driving wheels of the vehicle, in accordance with a driving force distribution control signal, a means for estimating an amount of engine braking applied on the vehicle, and a controller means for controlling the driving force distribution ratio by producing the control signal in accordance with the amount of engine braking estimated by the estimating means. FIG. 1 schematically shows these three means by solid lines.

The control system according to the present invention may further include a means for sensing a decelerating condition of the vehicle, as schematically shown by a broken line in FIG. 1. In this case, the driving force distribution ratio is controlled in accordance with the amount of engine braking when the decelerating condition exists.

DETAILED DESCRIPTION OF THE INVENTION

Figure 1:
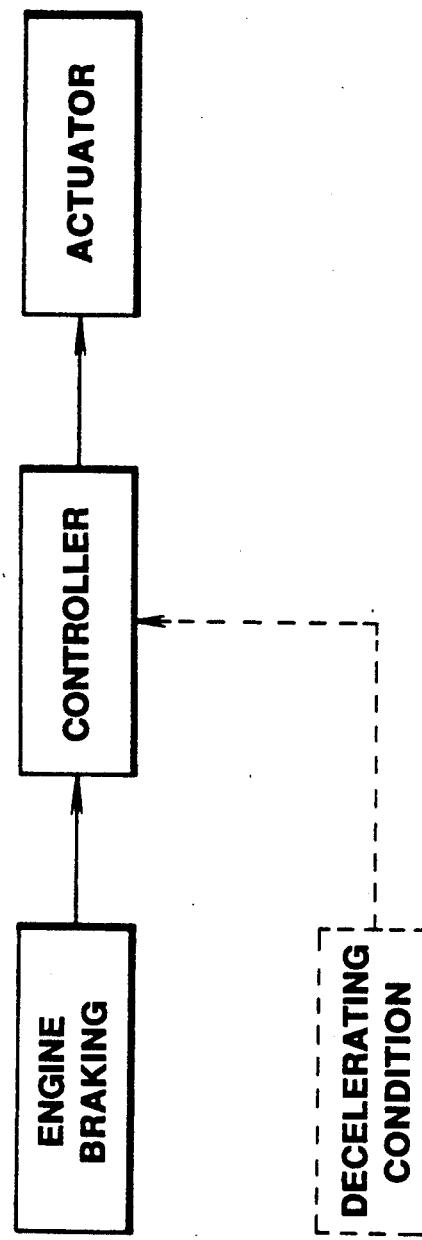
FIG. 1 is a block diagram schematically showing basic elements which are used in the present invention.
Figure 2:
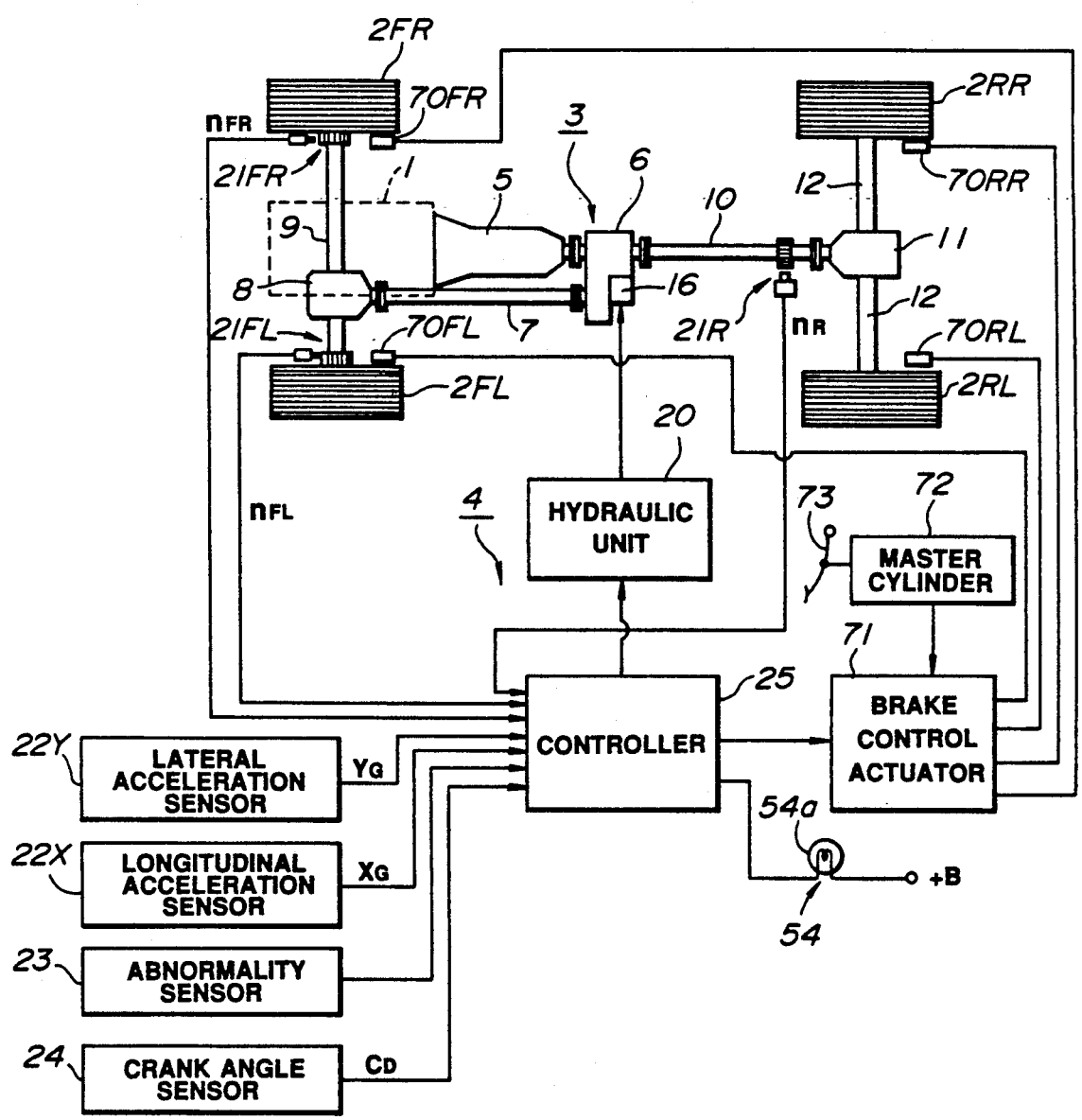
FIG. 2 is a schematic view of a vehicle for showing a first embodiment of the present invention.
Figure 3:
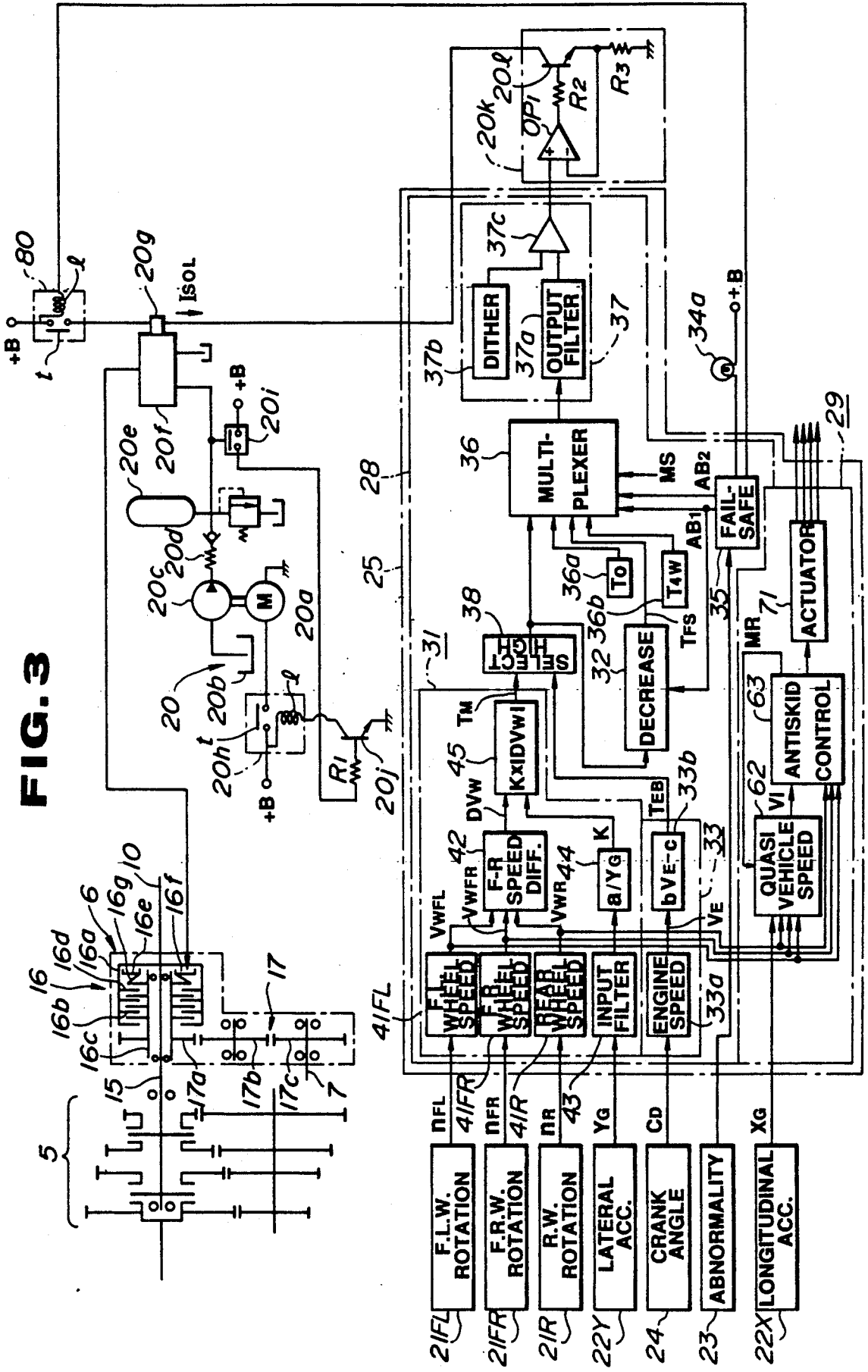
FIG. 3 is a block diagram showing a controller of the first embodiment and other components associated with the controller.

A first embodiment of the present invention is shown in FIGS. 2 and 3.

A 4 WD vehicle shown in FIG. 2 has an engine 1, left and right front wheels 2FL and 2FR, left and right rear wheels 2RL and 2RR, a drive system 3 capable of continuously varying a driving force distribution between the front and rear wheels, and a driving torque distribution controlling system 4.

The drive system 3 includes a transmission 5 for varying a gear ratio between input and output speeds, and a transfer 6 for distributing the driving force (torque) transmitted from the engine 1 through the transmission 5, between the front and rear wheels. In the first embodiment (as well as in a second embodimet shown in FIG. 14), the rear wheels 2RL and 2RR are primary driving wheels which are always in driving connection with an output shaft of the transmission 5, and the front wheels 2FL and 2FR are secondary driving wheels which can be disconnected from the transmission 5 by the transfer 6.

From the transfer 6, a front wheel driving force (torque) is transmitted through a front drive shaft 7, a front differential gear 8, front wheel axle shafts 9 to the front wheels 2FL and 2FR. A rear wheel driving force (torque) is transmitted from the transfer 6, through a rear drive shaft (propeller shaft) 10, a rear differential gear 11, rear wheel axle shafts 12, to the rear wheels 2RL and 2RR.

As shown schematically in FIG. 3, the transfer 6 includes an input shaft 15, a transfer clutch 16, and a gear train 17. One end of the input shaft 15 is connected with the output shaft of the transmission 5, and the other end of the input shaft 15 is connected with the rear drive shaft 10. The transfer clutch 16 of this embodiment is a wet type multiple disc clutch. The transfer clutch 16 is disposed in a drive path to the front wheels. Therefore, the transfer clutch 16 can make and break the driving connection between the transmission 5 and the front wheels, and vary continuously the driving force distribution between the front and rear wheels. The gear train 17 is disposed between the transfer clutch 16 and the front drive shaft 7. When the transfer clutch 16 is not in the fully disengaged state, the front wheel driving force is transmitted from the transfer clutch 15 through the gear train 17 to the front drive shaft 7.

The transfer clutch 16 has a clutch drum 16a splined to the input shaft 15, friction plates 16b engaged with the clutch drum 16a, a clutch hub 16c rotatably mounted on the input shaft 15 through needle bearings, friction discs 16d engaged with the clutch hub 16c, a clutch piston 16e provided on one side of the alternating pack of the friction plates and discs 16b and 16d, a cylinder chamber 16f formed between the piston 16e and the clutch drum 16a, and a return spring 16g acting on the piston 16e.

The gear train 17 has an input gear 17a splined to the clutch hub 16c, an intermediate gear 17b engaging with the input gear 17a, and an output gear 17c which is in engagement with the intermediate gear 17b and connected with the front drive shaft 7.

Figure 4:
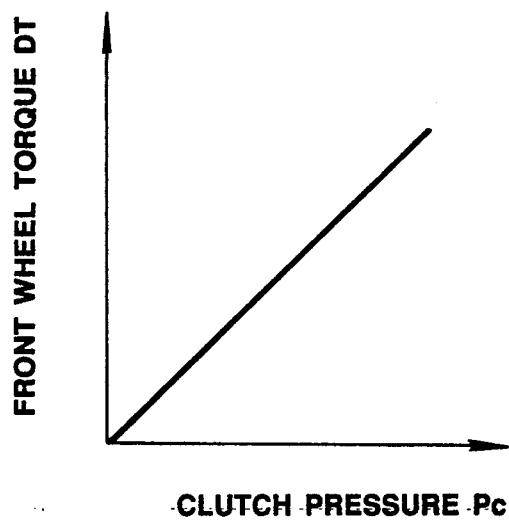
FIG. 4 is a graph showing a relationship of a torque transmitted to front wheels through a transfer clutch shown in FIG. 3, with respect to a clutch fluid pressure.

When the fluid pressure is null in the cylinder chamber 16f, the friction plates and discs 16b and 16d are disengaged by the aid of the return spring 16g. In this state, all the input torque transmitted from the engine 1 to the input shaft 15 of the transfer 6 is transmitted to the rear wheels through the rear drive shaft 10, and none is transmitted to the front wheels. This state is a complete 2 WD state. When a control oil pressure Pc is supplied to the cylinder chamber 16f, the clutch piston 16e pushes the pack of the friction plates and discs, and produces a clutch engagement force due to friction between the friction plates and discs 16b and 16d, so that a portion of the input torque is transmitted to the front wheels through the front drive shaft 7. A relationship of a front wheel driving torque DT transmitted to the front wheels through the transfer clutch 16 with respect to an oil pressure P is given by;

$$DT = P \times S \times 2n \times \mu \times r_m. \quad\quad\quad\quad (1)$$

where S is a pressure acting area of the piston 16e, n is the number of the friction discs, $\mu$(mu) is a friction coefficient of the clutch plates, and $r_m$ is an effective radius for torque transfer. Thus, the torque DT transmitted through the transfer clutch 16 is substantially proportional to the control oil pressure Pc, as shown in FIG. 4. Therefore, it is possible to continuously vary a driving force (torque) distribution ratio which is a ratio of the front wheel driving torque transmitted to the front wheels to the rear wheel driving torque transmitted to the rear wheels, from a minimum value (0:100, the complete 2 WD state) to a maximum value (50:50, the complete 4 WD state) by varying the engagement force of the transfer clutch 16.

Similar transfers are disclosed in the before-mentioned U.S. Pat. Nos. 4,757,870 ; 4,754,834 ; 4,773,500 and 4,776,424.

The driving force distribution controlling system 4 includes a hydraulic unit 20 for supplying the control fluid pressure Pc to the transfer clutch 16, a group of sensors, and a controller 25. The sensors are front rotation sensors 21FL and 21FR for sensing, respectively, the number of revolutions $n_{FL}$ of the front left wheel 2FL and the number of revolutions $n_{FR}$ of the front right wheel 2FR, a rear rotation sensor 21R for sensing the number of revolutions $n_R$ of the rear wheels 2RL and 2RR by sensing the number of revolutions of the rear drive shaft 10, a lateral acceleration sensor 22Y for sensing a lateral acceleration $Y_G$ of the vehicle body, a longitudinal acceleration sensor 22X for sensing a longitudinal acceleration $X_G$ of the vehicle body, an abnormality sensor 23 for sensing abnormalities in the components of the controlling system 4, and a crank angle sensor 24 for sensing a crank angle $C_D$ of the engine 1. Signals produced by these sensors are inputted into the controller 25.

Figure 5:
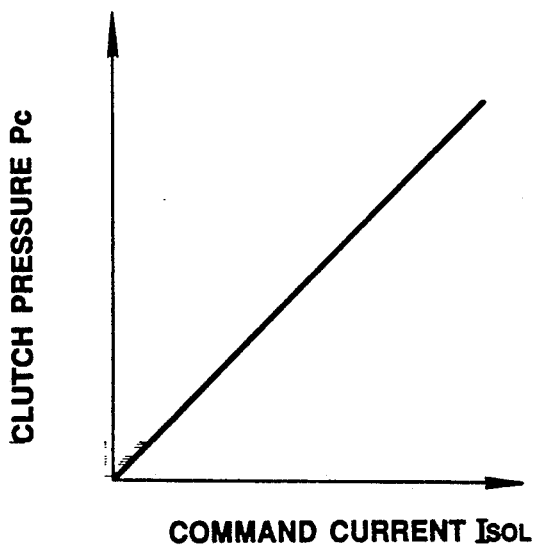
FIG. 5 is a graph showing a relationship of the clutch fluid pressure with respect to a command current supplied to a pressure control valve shown in FIG. 3.

The hydraulic unit 20 includes an electric motor 20a, an oil tank 20b, an oil pump 20c which is driven by the motor 20a and which is arranged to supply a pressurized oil to the transfer clutch 16 by sucking the oil from the tank 20b, a check valve 20d disposed on the output side of the pump 20c, an accumulator 20e connected to a junction point of an oil passage between the check valve 20d and the transfer clutch 16, and a pressure control valve 20f of an electromagnetic proportional control type, disposed in the oil passage between the above-mentioned junction point and the transfer clutch 16. The pressure control valve 20f varies the control oil pressure Pc supplied to the transfer clutch 16 in accordance with a command current Isol supplied to a proportional solenoid 20g of the pressure control valve 20f. As shown in FIG. 5, the control pressure Pc varies in proportion to the command current Isol for energizing the solenoid 20g. One end of a magnetizing winding of the motor 20a is connected through a motor relay 20h to a positive power source B, and the other end of the winding is grounded. The motor relay 20h is controlled by a pressure switch 20i through a switching transistor 20j. The pressure switch 20i is arranged to sense a line pressure in the oil passage between the accumulator 20e and the pressure control valve 20f. The switching transistor 20j has a base which is connected to the positive power source B through a resistor $R_1$ and the pressure switch 20i, a collector which is connected to the positive power source B through a relay coil of the motor relay 20h, and an emitter which is connected to the ground. When the line pressure in the passage between the accumulator 20e and the pressure control valve 20f is equal to or higher than a predetermined pressure, the pressure switch 20i is in an off state to turn off the switching transistor 20j. Therefore, the switching transistor 20j in its off state causes a normally open contract of the motor relay 20h to open, and switches off the electric motor 20a. When the line pressure between the accumulator 20e and the pressure control valve 20f is lower than the predetermined pressure, the pressure switch 20f is put in an on sate to turn on the switching transistor 20j. Therefore, the motor relay 20h closes its the oil pump 20c to increase the line presssure by turning on the electric motor 20a.

A solenoid drive circuit 20k is connected with one end of the solenoid 20g of the pressure control valve 20f, the other end of which is connected to the positive power source B. The solenoid drive circuit 20k includes an operational amplifier $OP_1$ whose noninverting input is arranged to receive a command voltage $V_c$ from the controller 25, and a power transistor 201 having a base connected through a resistor $R_2$ with the output of the operational amplifier $OP_1$, a collector connected with one end of the solenoid 20g, and an emitter connected to the ground through a resistor $R_3$.

Figure 6:
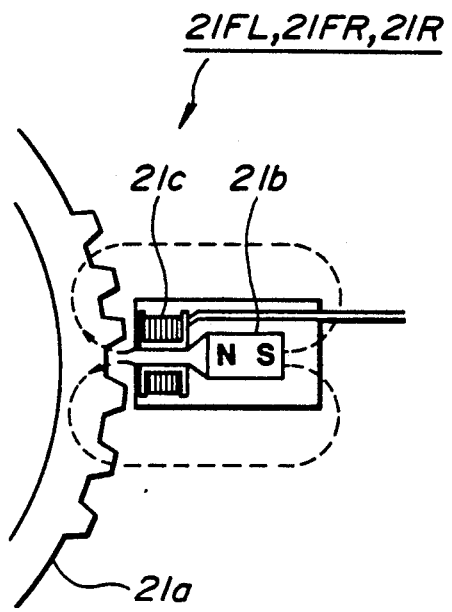
FIG. 6 is a schematic view showing a rotation sensor used as each of rotation sensors 21FL, 21FR and 21R shown in FIG. 3.

Each of the rotation sensors 21FL, 21FR and 21R includes a rotor 21a, a magnet 21b and a coil 21c, as shown in FIG. 6. The rotors 21a of the rotation sensors 21FL, 21FR and 21R are mounted, respectively, on the left and right front axle shafts 9, and the rear drive shaft 10. In each rotation sensor, the rotor 21a has a periphery formed with a serration, and the magnet 21b confronts the periphery of the rotor 21a. The coil 21c is arranged to sense an induced electromotive force by magnetic flux of the magnet 21b. The electromotive force having a frequency corresponding to the rotational speed of the rotor 21a is delivered from the coil 21c to the controller 25.

The lateral acceleration sensor 22Y produces a voltage signal $Y_G$ corresponding to the sensed lateral acceleration produced in the vehicle body, and delivers this signal to the controller 25. The longitudinal acceleration sensor 22X produces a voltage signal $X_G$ corresponding to the longitudinal acceleration produced in the vehicle body, and delivers this signal to the controller 25.

Figure 7:
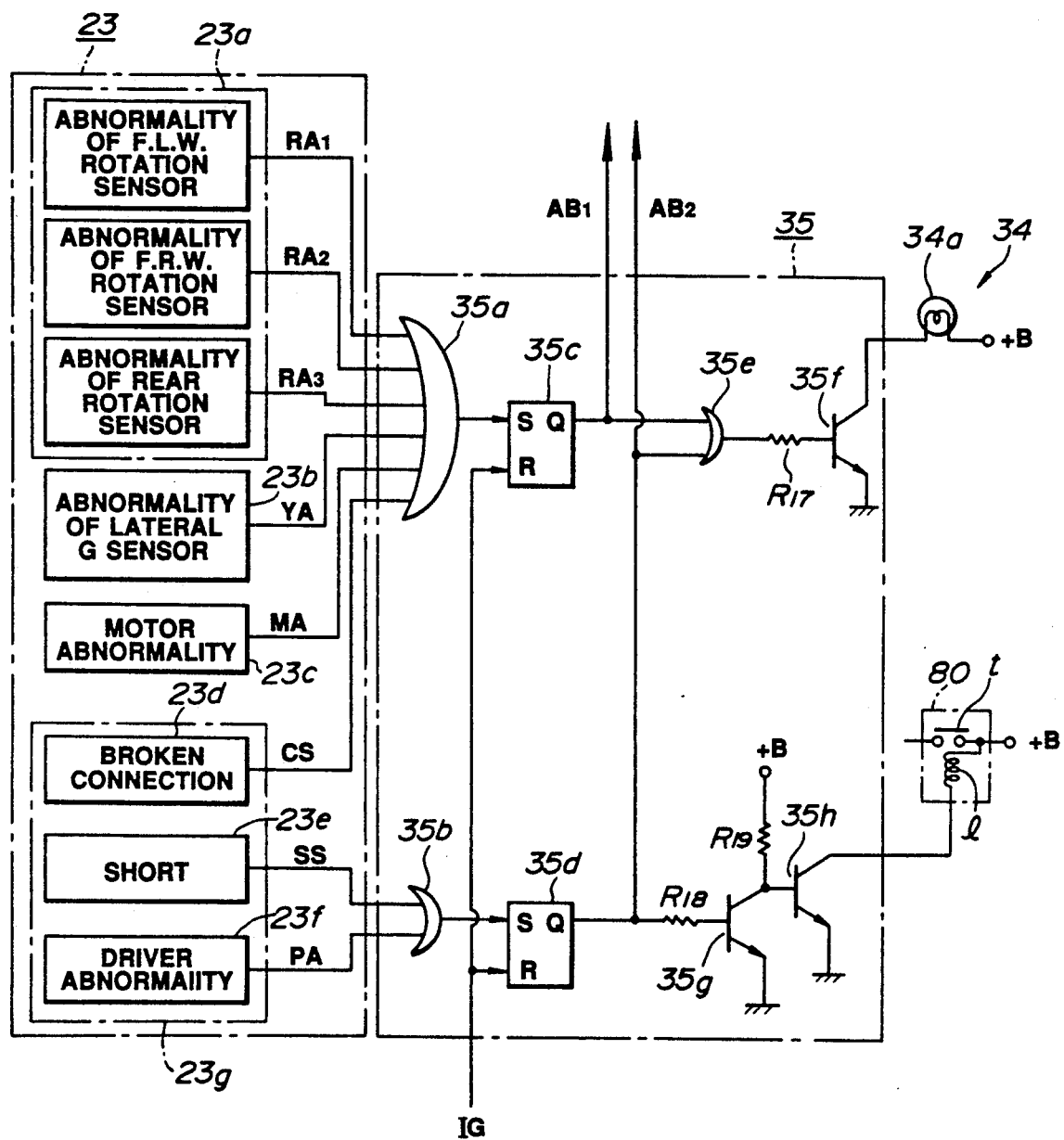
FIG. 7 is a block diagram showing an abnormality sensor 23 and a fail-safe section 35 shown in FIG. 3.

As shown in FIG. 7, the abnormality sensor 23 includes first, second, third and fourth detecting circuits 23a, 23b, 23c and 23g. The first detecting circuit 23a has three sections which detect abnormal conditions, such as broken wire, of the rotation sensors 21FL, 21FR and 21R, respectively, by detecting absences of the output signals of these sensors, and produces abnormality detection signals $RA_1$, $RA_2$ and $RA_2$, respectively. Each section of the first detecting circuit 23a produces a rotation sensor abnormality detection signal $RA_1$, $RA_2$, or $RA_3$ of the logical value "1" if such an abnormal condition persists longer than a predetermined time length, for example 0.5 second. The second detecting circuit 23b is designed to detect an abnormality on the output side of the lateral acceleration sensor 22Y by comparing the output signal $Y_G$ produced by the lateral acceleration sensor 22Y with a predetermined value Vs (for example, a predetermined voltage value corresponding to 1.2 g which is not reached normally). The second detecting circuit 23b produces a lateral acceleration sensor abnormality detection signal YA of the logical value "1" if an abnormal condition in which $Y_G$ is higher than Vs persists longer than a predetermined time length, 0.5 s, for example. The third detecting circuit 23c is designed to detect abnormalities in the motor 20a, the pump 20c and the motor relay 20h of the hydraulic unit 20, and to produce a motor abnormality detection signal MA of the longical value "1" if any of the abnormalities in these components persists longer than 0.5 s, for example. The fourth detecting circuit 23g includes three sections 23d, 23e and 23f. The first section 23d detects a broken connection in the solenoid 20g of the pressure control valve 20f, and produces a broken connection detection signal Cs of the longical value "1" if an abnormal condition lacking continuity persists longer than 0.5 s, for example. The second section 23e detects a short circuit in the solenoid 20g, and produces a short detection signal SS of the longical value "1" if a short circuit condition continues longer than the predetermined time length, 0.5 s, for example. The third section 23f is designed to detect an abnormality in the current supply to the solenoid 20g, and produces a current supply abnormality detection signal PA of the logical value "1" if an abnormal condition in the current supply to the solenoid 20g continues longer than 0.5 sec, for example.

The controller 25 includes a driving force distribution control section 28 and an antiskid control section 29, as shown in FIG. 3.

The driving force distribution control section 28 includes a first clutch engagement force calculating section 31 for calculating a first clutch engagement force $T_M$ in accordance with the output signals of the rotation sensors 21FL, 21FR and 21R and the lateral acceleration sensor $Y_G$, a clutch engagement force decreasing section 32 for decreasing the clutch engagement force, a second clutch engagement force calculating section 33 for calculating a second clutch engagement force $T_{EB}$ dependent on an engine braking amount in accordance with the output signal of the crank angle sensor 24, a fail-safe section 35 for producing first and second abnormality signals $AB_1$ and $AB_2$ in accordance with the signals of the abnormality sensor 23, an analog multiplexer (selector) 36 for selecting one of the various magnitudes of the clutch engagement force in accordance with the abnormality signals, and an output section 37 for driving the solenoid 20g of the hydraulic unit 20 in accordance with the output of the analog multiplexer 36.

The driving force distribution control section 28 of the first embodiment further includes a select high switch 38.

The first clutch engagement force calculating section 31 includes three circuits 41FL, 41FR and 41R for calculating a wheel speed (peripheral speed) $Vw_{FL}$ of the front left wheel 2FL, a wheel speed $Vw_{FR}$ of the front right wheel 2FR, and wheel speed $Vw_R$ of the rear wheels, a circuit 42 for calculating a front and rear wheel speed difference DVw, a circuit 44 for receiving the lateral acceleration $Y_G$ from the lateral acceleration sensor 22Y through an input filter 43 and determining a gain K in accordadnc with the lateral acceleration $Y_G$, and a circuit 45 for calculating the first clutch engagement force $T_M$ in accordance with the speed difference DVw and the gain K. The wheel speed calculating circuits 41FL, 41FR and 41R, respectively, receive the numbers of revolutions $n_{FL}$, $n_{FR}$ and $n_R$, and determines the wheel speeds (peripheral speeds) $Vw_{FL}$, $Vw_{FR}$ and $Vw_R$ from the number of revolutions, and the radius of each wheel. The front and rear wheel speed difference calculating circuit 42 determines the front and rear wheel speed difference DVw between the front wheel speed and the rear wheel speed, from the front left and front right wheel speeds $Vw_{FL}$ and $Vw_{FR}$ and the rear wheel speed $Vw_R$, in accordance with the following equation (2).

$$DVw = 2Vw_R - Vw_{FL} - Vw_{FR} \quad\quad\quad (2)$$

The gain K determined by the gain calculating circuit 44 is proportional to the reciprocal of the lateral acceleration $Y_G$ ($K = a/Y_G$ where a is a constant). The first clutch engagement force calculating circuit 45 determines the first clutch engagement force $T_M$ by multiplying the absolute value of the front and rear wheel speed difference DVw determined by the circuit 42, by the gain K determined by the circuit 44. That is, $T_M = K \times |Dvw|$.

The select high switch 38 selects whichever has a greater magnitude, out of the first and second clutch engagement forces $T_M$ and $T_{EB}$. Therefore, the output of the select high switch 38 is equal to $T_M$ when $T_M$ is greater than $T_{EB}$, and equal to $T_{EB}$ when $T_{EB}$ is greater than $T_M$.

Figure 8:
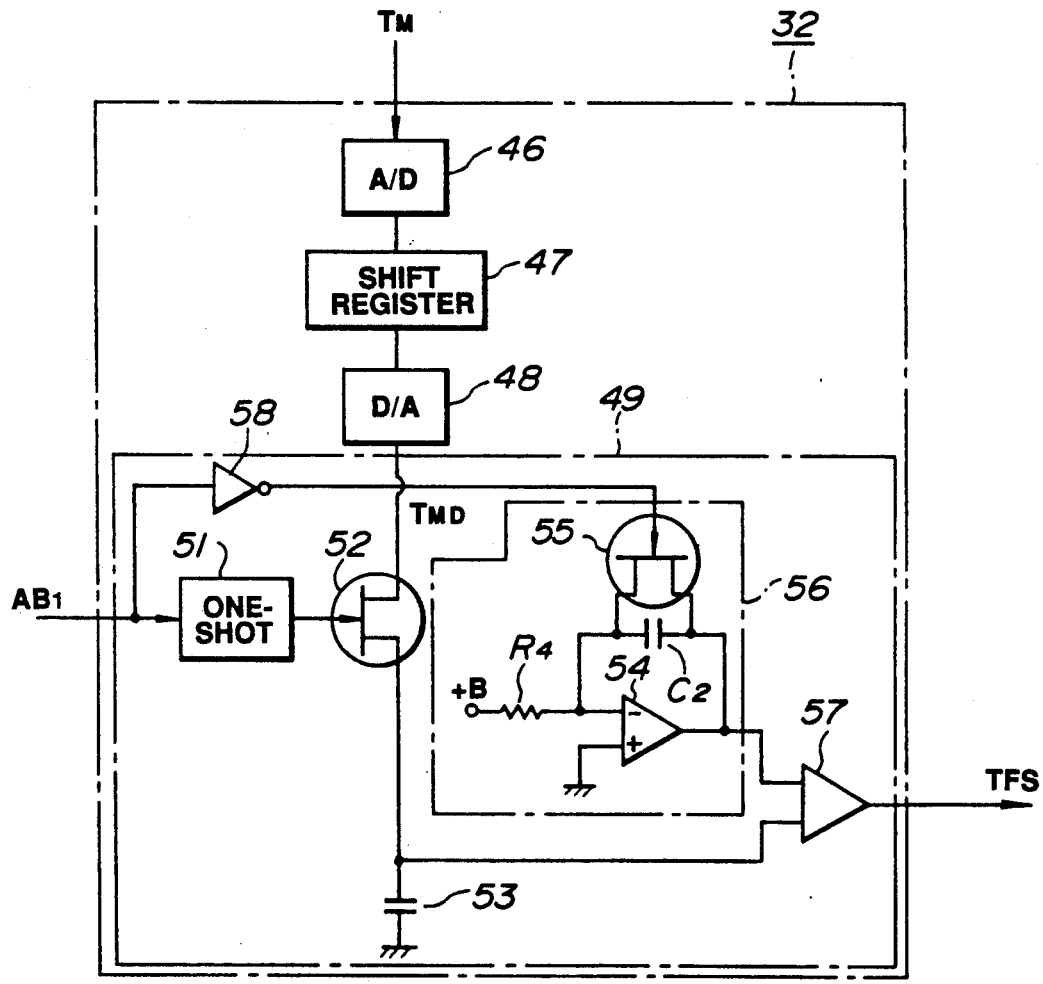
FIG. 8 is a block diagram showing a clutch engagement force decreasing section 32 shown in FIG. 3.

The clutch engagement force decreasing section 32 includes, as shown in FIG. 8, an analog-to-digital converter 46, a shift register 47, a digital-to-analog converter 48, and a clutch engagement force decreasing circuit 49. The A/D converter 46 receives one of the first and second engagement forces $T_M$ and $T_{EB}$ selected by the select high switch 38, and converts the selected clutch engagement force from an analog signal to a digital signal. The shift register 47 successively stores values of the digital signal outputted from the A/D converter 46, and outputs a delayed clutch engagement force $T_{MD}$ at an instant delayed by the predetermined time interval (0.5 sec) of the abnormality sensor 23. The delayed clutch engagement force $T_{MD}$ of the shift register 47 is inputted through the D/A converter 48 into the clutch engagement force decreasing circuit 49.

The clutch engagement force decreasing circuit 49 includes a field-effect transistor 52 serving as an analog switch, an integrator 56 and an adder 57, as shown in FIG. 8. The field-effect transistor 52 has a drain receiving the delayed clutch engagement force $T_{MD}$ of the analog form from the D/A converter 48, a gate receiving the first abnormality detection signal $AB_1$ from the fail-safe section 35 through a one-shot multivibrator (monostable multivibrator) 51, and a source which is connected to the ground through a charging capacitor 53. The integrator 56 has an operational amplifier 54 having an inverting input connected with the positive power source B through a resistor $R_4$, and a noninverting input connected to the ground. Between the inverting input and output of the operational amplifier 54, there is connected a parallel combination of a capacitor $C_2$ and a field-effect transistor 55. The adder 57 adds a voltage of the charging capacitor 53, and an output voltage of the integrator 56. The first abnormality detection signal $AB_1$ of the fail-safe section 35 is inputted through an inverter 58 into the gate of the field-effect transistor 55 of the integrator 56.

Figure 10:
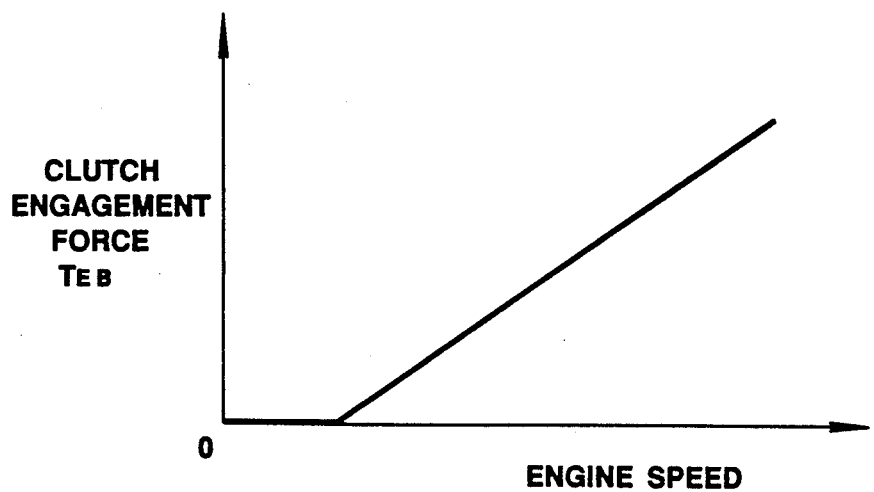
FIG. 10 is a graph showing a relationship of a second clutch engagement force $T_{EB}$ with respect to an engine speed, which is used in the first embodiment.

The second clutch engagement force calculating section 33 includes an engine speed calculating circuit 33a and a second clutch engagement force calculating circuit 33b, as shown in FIG. 3. The engine speed calculating circuit 33a serves as a means for estimating an engine braking amount, and calculates an engine revolution speed $V_E$ of the engine 1 by using the crank angle signal $C_D$ sent from the crank angle sensor 24. The circuit 33b determines the second engagement force $T_{EB}$ in accordance with the engine speed $V_E$ determined by the engine speed calculating circuit 33a. FIG. 10 shows a relationship between the second clutch engagement force $T_{EB}$ determined by the circuit 33b and the engine speed $V_E$. The second clutch engagement force $T_{EB}$ is relatively small, and equal to about half of the engine braking amount (which is equal to about 8 kgm at the maximum). As shown in FIG. 10, $T_{EB}$ is fixed at zero in the range in which the $V_E$ is smaller than a predetermined threshold value. In the range in which $V_E$ is higher than the predetermined threshold value, $T_{EB}$ is increased linearly in accordance with the following equation (3).

$$T_{EB} = bV_E - c \quad\quad\quad (3)$$

The fail-safe section 35 includes three OR circuits 35a, 35b and 35e, two RS flip-flops 35c and 35d, and three switching transistors 35f, 35g and 35h, as shown in FIG. 7. The first OR circuit 35a has first, second and third inputs receiving the rotation sensor abnormality detection signals $RA_1$, $RA_2$ and $RA_3$, respectively, from the abnormality detection circuit 23a, a fourth input receiving the lateral acceleration abnormality detection signal YA from the detecting circuit 23b, a fifth input receiving the motor abnormality detection signal MA from the detecting circuit 23c, and a sixth input receiving the broken connection detection signal CS from the circuit 23d. The second OR circuit 35b has a first input receiving the short detection signal SS from the circuit 23e, and a second input receiving the current supply abnormality detection signal PA from the circuit 23f. The first RS flip-flop 35c has a Set terminal receiving the output signal of the first OR circuit 35a, and a Reset terminal receiving an ignition-on signal IG from an ignition switch of the vehicle. The second RS flip-flop 35d has a Set terminal receiving the output signal of the second OR circuit 35b, and a Reset terminal receiving the ignition-on signal IG from the ignition switch. The third OR circuit 35e has two input terminals receiving the affirmative outputs (Q outputs) of the first and second flip-flops 35c and 35d. The first switching transistor 35f has a base receiving the output of the third OR circuit 35e through a resistor $R_{17}$, a collector connected to a warning lamp 34a of a warning circuit 34, and an emitter connected to the ground. The second switching transistor 35g has a base receiving the affirmative output (Q output) of the second flip-flop 35d through a resistor $R_{18}$, a collector connected to the positive power source B through a resistor $R_{19}$, and an emitter connected to the ground. The third switching transistor 35h has a base receiving the collector voltage of the second switching transistor 35g, a collector and an emitter connected to the ground. The collector of the third switching transistor 35h is connected to the positive power source B through a relay coil of a solenoid relay circuit 80 which is connected between the proportional solenoid 20g of the hydraulic unit 20 and the positive power source B. The affirmative (Q) output of the first flip-flop 35c is sent, as the first abnormality detection signal $AB_1$, to the clutch engagement force decreasing section 32, and the analog multiplexer 36. The affirmative (Q) output of the second flip-flop 35d is sent, as the second abnormality detection signal $AB_2$, to the analog multiplexer 36.

The analog multiplexer 36 of the first embodiment has four data input terminals, and three select inputs. The first data input terminal is connected with the output of the select high switch 38, for receiving $T_M$ or $T_{EB}$ selected by the select high switch 38. The second data input terminal is connected with a circuit 36a which supplies the analog multiplexer 36 with a minimum clutch engagement force $T_0$. The minimum clutch engagement force $T_0$ is fixed at zero, so that the transfer clutch 16, if $T_0$ is selected, is fully disengaged, and the drive system is put in the complete 2 WD state. The third data input terminal of the analog multiplexer 36 is connected with the output terminal of the clutch engagement decreasing section 32, for receiving the clutch engagement force $T_{FS}$ of the decreasing section 32. The fourth data input terminal is connected with a circuit 36b which supplies the multiplexer 36 with a maximum clutch engagement force $T_{4w}$. The maximum clutch engagement force $T_{4w}$ has a fixed value (50 kgm, for example) to fully engage the transfer clutch 16, and to bring the drive system to the complete 4 WD state.

Into the three select input terminals of the analog multiplexer 36, the first and second abnormality detection signals $AB_1$ and $AB_2$ of the fail-safe section 35, and a manual select signal MS are, respectively, inputted as control signals. The analog multiplexer 36 selects one of the four input signals inputted to the four data input terminals in accordance with the three control signals inputted into the three select input terminals, in the following manner. The analog multiplexer 36 selects the input signal $T_M$ or $T_{EB}$ inputted into the first data input terminal from the select high switch 38 when all the three control signals inputted to the select input terminals are at the logical "0" level, selects the clutch engagement force $T_{SF}$ of the decreasing section 32 when the first abnormality detection signal $AB_1$ of the logical value "1" is inputted from the fail-safe section 35, selects the zero clutch engagement force $T_0$ of the circuit 36a when the second abnormality detection signal $AB_2$ of the logical value "1" is inputted from the fail-safe section 35, and selects the maximum clutch engagement force $T_{4W}$ to fully engage the transfer clutch 16 when the manual select signal MS is inputted from an auto/manual selector switch. Then, the analog multiplexer 36 delivers the selected clutch engagement force to the driver circuit 37.

The output circuit 37 includes an output filter 37a receiving the clutch engagement force selected by the analog multiplexer 36, a dither signal generating circuit 37b, and an adding circuit 37c for adding the outputs of the output filter 37a and the dither circuit 37b. The adding circuit 37c outputs, to the solenoid drive circuit 20k, a command voltage Vc corresponding to the clutch engagement force.

The antiskid brake control (wheel slip brake control) section 29 includes a quasi vehicle speed calculating circuit 62, and an antiskid control circuit 63, as shown in FIG. 3. The quasi vehicle speed calculating circuit 62 receives the longitudinal acceleration $X_G$ from the longitudinal acceleration sensor 22X, and the wheel speeds $Vw_{FL}$, $Vw_{FR}$ and $Vw_R$ from the wheel speed calculating circuits 41FL, 41FR and 41R, and calculates a quasi vehicle speed Vi. The antiskid control circuit 63 performs the antiskid brake control during braking in accordance with the quasi vehicle speed Vi, and the wheel speeds $Vw_{FL}$, $Vw_{FR}$ and $Vw_R$.

Figure 11:
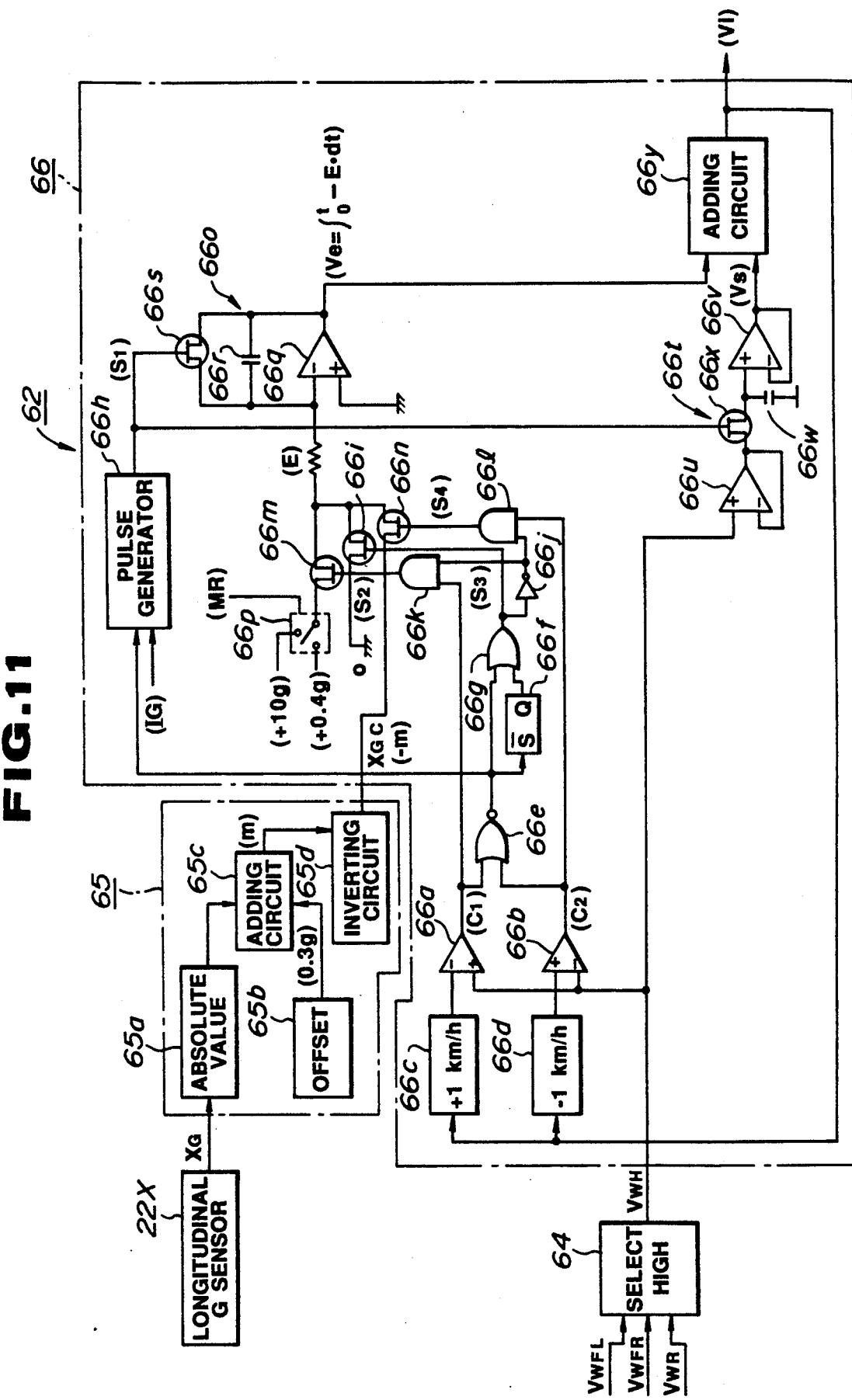
FIG. 11 is a block diagram showing a circuit 62, shown in FIG. 3, for determining a quasi vehicle speed $V_i$.

The quasi vehicle speed calculating circuit 62 includes a select high switch 64, a correction circuit 65 and a calculation circuit 66, as shown in FIG. 11. The select high switch 63 selects the highest one (select high wheel speed $Vw_H$) of the wheel speeds $Vw_{FL}$, $Vw_{FR}$ and $Vw_R$. It can be considered that the highest wheel speed is closest to the real vehicle speed. The correction circuit 65 is designed to correct the longitudinal acceleration $X_G$ sent from the sensor 22X, and provide a corrected longitudinal acceleration $X_{GC}$. The calculation circuit 66 calculates the quasi vehicle speed Vi from the corrected longitudinal acceleration $X_{GC}$, the select high vehicle speed $Vw_H$ and a MR signal. The quasi vehicle speed Vi determined by the calculation circuit 66 is inputted into the antiskid control circuit 63.

The correction circuit 65 includes an absolute value circuit 65a, an offset circuit 65b, an adding circuit 65c and an inverting circuit 65d. The longitudinal acceleration sensor 22X yields a voltage proportional to the deceleration or acceleration of the vehicle body. The polarity of the output voltage of the sensor 22X is positive in the case of deceleration, and negative in the case of acceleration. The absolute value circuit 65a receives the longitudinal acceleration $X_G$ from the sensor 22X and delivers the absolute value of the longitudinal acceleration $X_G$ to the adding circuit 65c. The offset circuit 65b delivers, to the adding circuit 65c, a predetermined offset value to correct the longitudinal acceleration $X_G$. For example, the offset value is set equal to a value corresponding to 0.3 G. The adding circuit 65c adds the offset value to the absolute value of the longitudinal acceleration $X_G$, and outputs the corrected longitudinal acceleration $X_{GC}$ which is the sum of the absolute value of the longitudinal acceleration and the offset value. Thus, the corrected longitudinal acceleration $X_{GC}$ is obtained by offsetting the absolute value of the longitudinal acceleration $X_G$ by 0.3 g. The inverting circuit 65d provides a voltage corresponding to a vehicle body deceleration slope $-m$ by inverting the corrected longitudinal acceleration $X_{GC}$.

The calculation circuit 66 includes two comparators 66a and 66b, an adder 66c, a subtracter 66d, and a NOR gate 66e, as shown in FIG. 11. The select high wheel speed $Vw_H$ is inputted to one input terminal of each of the comparators 66a and 66b. The adder 66c and subtracter 66d provide a dead band of $\pm 1$ km/h in the quasi vehicle speed Vi, and they are connected, respectively, with the other input terminals of the comparators 66a and 66b. Output signals $C_1$ and $C_2$ of the comparators 66a and 66b are inputted into the NOR gate 66e. The comparator 66a delivers the high level output $C_1$ when the select high wheel speed $Vw_H$ is equal to or higher than $Vi + 1$ km/h ($Ww_H \geq Vi + 1 km/h$). The comparator 66b delivers the high level output $C_2$ when $Vw_H$ is smaller than a difference resulting from subtraction of 1 km/h from Vi ($Vw_H < Vi - 1$ km/h). Therefore, the NOR gate 66e delivers a high level output signal when $Vi - 1 km/h \leq VW_H < Vi + 1 km/h$, and both of the output signals $C_1$ and $C_2$ are, at the low level.

The output of the NOR gate 66e is inputted into a timer 66f, an OR gate 66g, and a shot pulse generating circuit 66h. The timer 66f is triggered by a rise of the output signal of the NOR gate 66e, and provides a high level signal for a predetermined time interval $T_3$ to the OR gate 66g.

The output signal of the OR gate 66g is supplied as a select signal $S_3$ to a gate of an analog switch 66i. Furthermore, the output signal of the OR gate 66g is inverted by an inverter 66j and then inputted to first input terminals of two AND gates 66k and 66l. The remaining second input terminals of the AND gates 66k and 66l receive the signals $C_1$ and $C_2$, respectively. The output signals of the AND gates 66k and 66l are supplied, respectively, to gates of analog switches 66m and 66n, as select signals $S_2$ and $S_4$. The analog switch 66i is held in the on state, and holds a supply voltage E to an integrating circuit 66o, equal to zero while the select signal $S_1$ is at the high level. While the select signal $S_2$ is at the high level, the analog switch 66m is held in the on state, and supplies, to the integrating circuit 66o, the supply voltage E which is set equal to either a value corresponding to a maximum value of the vehicle acceleration (the rate of increase of the vehicle speed), for example 0.4 G, or a value corresponding to $+10$ G. While the select signal $S_4$ is at the high level, the analog switch 66n is held at the on state, and supplies, to the integrating circuit 66o, the supply voltage E corresponding to the vehicle body deceleration slope $-m$ of the inverting circuit 65d. The selection between $+0.4$ G and $+10$ G for the analog switch 66m is performed by a select switch 66p, which is arranged to select $+0.4$ G while the MR signal has the logical value "0", and to select $+10$ G during the antiskid control during which the MR signal is the logical value "1".

The integrating circuit 66o includes an amplifier 66q, a capacitor 66r and an analog switch 66s. The integrating circuit 66o is reset when the analog switch 66s is turned on by a high level reset signal $S_1$ supplied to its gate. The integrating circuit 66o continues integrating the voltage E after the reset signal has disappeared.

The reset signal $S_1$ is produced by the shot pulse generating circuit 66h. This pulse generating circuit 66h produces one shot pulse, as the reset signal $S_1$, by being triggered by the ignition signal IG when the engine is started, and thereafter produces one shot pulse, as the reset signal $S_1$, each time the output signal of the NOR gate 66e rises.

The reset signal $S_1$ is also used to reset a sample-and-hold circuit 66t, which includes buffer amplifiers 66u and 66v, a capacitor 66w and an analog switch 66x, and which receives the select high wheel speed $Vw_H$. When the analog switch 66x is turned on by the high level reset signal $S_1$, the sample-and-hold circuit 66t is reset, and stores a curent value of the select high speed $Vw_H$ as a sampled wheel speed value Vs. An adding circuit 66y adds an integral $Ve = \int (-E) \cdot dt$ of the integrating circuit 66o, to the sampled wheel speed value Vs, and delivers the sum Vs+Ve, as the quasi vehicle speed Vi, to the antiskid control circuit 63.

The antiskid control circuit 63 is arranged to control an antiskid brake control acuator 71 for varying pressures supplied to wheel cylinders 70FL-70RR of the wheels 2FL-2RR, in accordance with the wheel speeds $Vw_{FL}$, $Vw_{FR}$ and $Vw_R$ and the quasi vehicle speed Vi. For example, the antiskid control circuit 63 is composed of a microcomputer.

Figure 12:
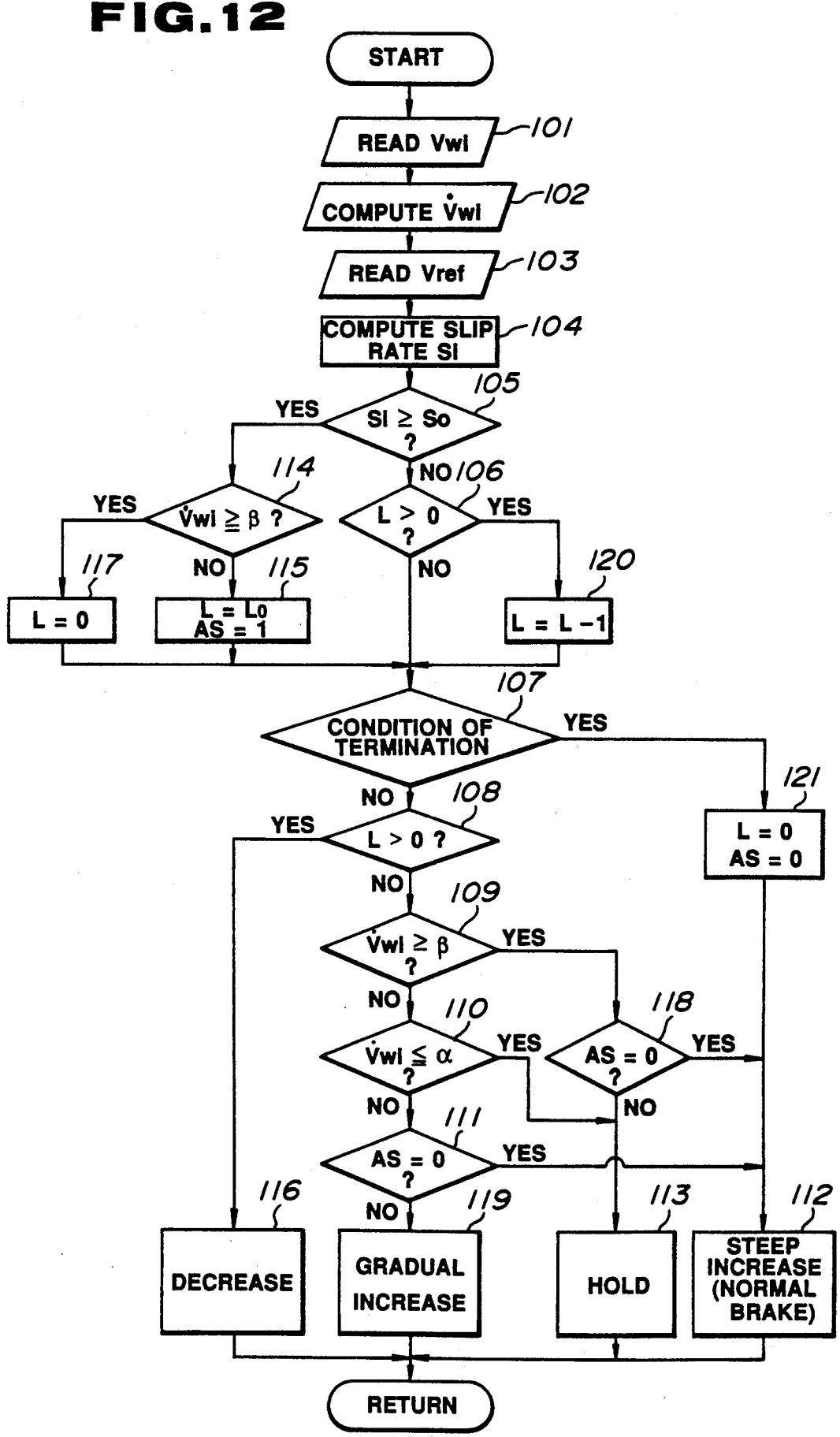
FIG. 12 is a flow chart showing a control process performed by an antiskid control section show in FIG. 3.

FIG. 12 shows an antiskid control process performed by the antiskid control circuit 63 of this embodiment. This control process is repeated at regular intervals of 20 msec, for example, as a timer interrupt process. In FIG. 12, AS represents a control flag, and L represents a pressure decrease timer. Both of AS and L are cleared to zero at a step 121 at the end of the previous execution. While the control flag AS is set at "1", the MR signal of the logical value "1" is supplied to the quasi vehicle speed calculating circuit 66 and the analog multiplexer 36 of the driving force distribution control section 28.

In the flow chart of FIG. 12, the antiskid control circuit 63 first reads the current value $Vw_{iN}$ of the wheel speed determined by the wheel speed calculating circuit 21i (i=FL, FR or R) at a step 101. At a next step 102, the control circuit 63 calculates the wheel acceleration or deceleration Vwi, that is the amount of change of the wheel speed during a unit time interval, by subtracting the current wheel speed $Vw_{iN}$ obtained at the step 101, from a previous wheel speed value $Vw_{iN-1}$, and stores the calculated wheel acceleration (or deceleration) at predetermined locations of a storage device 29d. At a step 103, the control circuit 63 reads the quasi vehicle speed Vi of the quasi vehicle speed calculating circuit 66. At a step 104, the control circuit 63 calculates a slip rate Si in accordance with the following equation (4).

$$Si = \frac{Vi - Vwi}{Vi} \times 100 \qquad (4)$$

The antiskid control circuit 63 produces an antiskid control signal CS to control the actuator 71, in accordance with the wheel acceleration Vwi and the slip rate Si, in the following manner.

When the brake is not applied, or at an initial stage of a brake operation, the slip rate Si is lower than a predetermined value (15%, for example), the control flag AS and the pressure decrease timer L are both equal to zero, and the wheel acceleration Vwi is higher than a predetermined threshold deceleration value alpha and lower than a predetermined threshold accelration value beta, i.e., $\alpha < \dot{V}wi < \beta$. In such a situation, the control circuit 63 proceeds via steps 105-111, to a step 112, and selects a steep increase mode to make the pressure of the actuator 71 equal to the pressure of the master cylinder 72. When, therefore, the brake pedal 73 is not depressed, and the brake system is inoperative, then the pressure of the master cylinder 72 is zero, and accordingly the pressure of the wheel cylinder 70i is held equal to zero. At the initial stage of the brake application, the pressure of the wheel cylinder 70i is increased quickly to actuate the brake with the pressure increase of the master cylinder 72.

Figure 13:
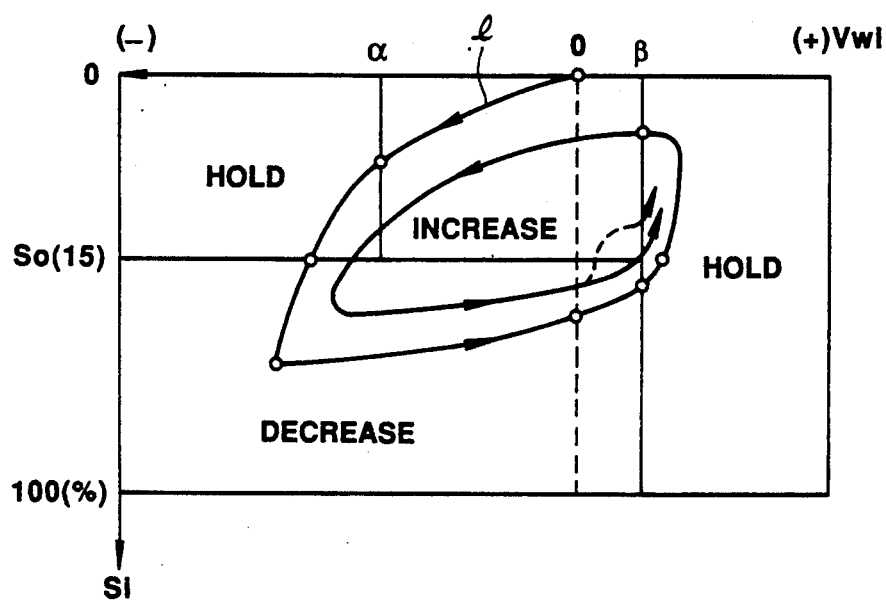
FIG. 13 is a view showing a control map used by the antiskid control section.

By the actuation of the brake, the wheel speed Vwi is decreased gradually, and the wheel deceleration $\dot{V}wi$ is increased as shown by a curve 1 (el) in FIG. 13. When the wheel deceleration $\dot{V}wi$ exceeds the threshold deceleration value alpha, then the control circuit 63 proceeds from the step 110 to a step 113, and selects a hold mode on a high pressure side to hold the pressure of the actuator 71 at a constant value. Even in the hold mode, the braking force is applied on the wheel. Therefore, the slip rate Si increases with the increase of the wheel deceleration $\dot{V}wi$, as shown by the curve (el) in FIG. 13.

When the slip rate Si exceeds the predetermined value $S_0$, and at the same the wheel deceleration $\dot{V}wi$ remains lower than the threshold acceleration value beta, the control circuit 63 proceeds from the step 105 through a step 114 to a step 115 to set the pressure decrease timer L to a predetermined value $L_0$, and to set the control flag AS equal to "1". Therefore, the control circuit 63 proceeds from the step 115 through the steps 107 and 108 to a step 116 to select a pressure decrease mode for gradually decreasing the pressure of the actuator 71.

In this decrease mode, the control circuit 63 decreases the braking force applied to the wheel. However, the wheel speed Vwi continues decreasing for a short while, and accordingly the wheel deceleration $\dot{V}wi$ and the slip rate Si both show a tendency to increase as shown by the curve (el) in FIG. 13, until the wheel speed Vwi stop decreasing and starts increasing.

Thus, in the decrease mode, the time rate of change $\dot{V}wi$ of the wheel speed increases in the positive direction toward the acceleration's side. When the rate of change $\dot{V}wi$ of the wheel speed exceeds the threshold acceleration value beta, then the control circuit 63 proceeds from the step 105 through the step 114 to a step 117. The control circuit 63 therefore clears the pressure decrease time L to "0" at the step 117, and then proceeds to the steps 107 and 108. In this case, the control is transferred from the step 108 to the step 109 because L=0, and from the step 109 to a step 118 because the time rate of change of the wheel speed is equal to or higher than beta ($\dot{V}wi \geq \beta$), and from the step 118 to the step 113 because the control flag AS is set equal to "1". Therefore, the brake control mode is changed to the hold mode to hold the pressure of the actuator 71 on the low pressure side.

In the low pressure side hold mode, the pressure in the wheel cylinder 70i is held at a constant value on the low pressure side, and the wheel speed Vwi continues increasing. Therefore, the time rate of change $\dot{V}wi$ increases in the positive direction, and the slip rate Si decreases.

When the slip rate Si becomes lower than the predetermined slip rate value $S_0$, the control circuit 63 proceeds from the step 105 to the step 106, and therefrom directly to the step 107 because the pressure decrease timer L is cleared to "0" in the low pressure side hold mode of the last time. Consequently, the low pressure side hold mode continues.

Even in this low pressure side hold mode, the braking force is acting on the wheel, so that the rate of increase of the wheel speed Vwi decreases gradually. When the rate of change $\dot{V}wi$ of the wheel speed becomes lower than the threshold acceleration value beta, then the control is transferred from the step 109 to the step 110. Therefrom, the control is transferred to the step 111 because the time rate of change $\dot{V}wi$ is still higher than alpha ($\dot{V}wi > \alpha$), and from the step 111 to the step 119 because the control flag AS is "1".

At the step 119, the control circuit 63 changes the control mode to a gradual increase mode in which the pressurized oil is supplied intermittently from the master cylinder 72 to the wheel cylinder 70i, and the pressure in the wheel cylinder 70i is increased in a stepwise manner.

In this gradual increase mode, the pressure in the wheel cylinder 70i is increased gradually, and the braking force applied to the wheel 2i is increased gradually, so that the wheel speed Vwi is decreased.

When the rate of change $\dot{V}wi$ of the wheel speed becomes equal to or lower than the threshold deceleration value alpha, then the control circuit 63 proceeds from the step 110 to the step 113 to perform the high pressure side hold mode. When the slip rate Si becomes equal to or higher than the predetermined slip rate value $S_0$, the route is from the step 105 via the step 114 to the step 115, and therefrom via the steps 107 and 108 to the step 116 for the decrease mode. Thereafter, the antiskid brake control system repeats the low pressure hold mode, gradual increase mode, high pressure hold mode and decrease mode, and effectively controls the degree of wheel slip.

When the vehicle speed is decreased to some extent, the slip rate Si sometimes recovers to a level smaller than the predetermined slip rate value $S_0$. In this case, the control circuit 63 proceeds from the step 105 to the step 106, and proceeds from the step 106 to a step 120 because the decrease timer L is set equal to the predetermined value $L_0$ at the step 115 for setting the decrease mode. Therefore, the control circuit 63 decreases the decrease timer L by 'one' at the step 120, and then proceedds to the step 107. When the decrease timer L becomes equal to "0" by the repetition of the steps 106 and 120, then the control circuit 63 follows the route of the steps 106, 107, 108, 109, 110, 111 and 119, and employs the gradual decrease mode at the step 119. Thereafter, the control mode is changed to the high pressure hold mode, and then to the gradual increase mode.

At the step 107, the control circuit 63 determines whether a predetermined condition for terminating the antiskid control is satisfied or not. In this embodiment, when the vehicle speed decreases below a predetermined low level close to zero or when the brake pedal 73 is released, and a brake switch produces an output signal of an off state, then the control circuit 63 decides at the step 107 that the antiskid control should be terminated, and proceeds from the step 107 to a step 121. Therefore, the control circuit 63 clears the decrease timer L and the control flag AS to "0" at the step 121, changes the control mode to the steep increase mode at the step 112, and terminates the antiskid control. When, therefore, the vehicle is brought to a stop with the brake pedal remaining depressed, the oil pressure of the master cylinder 72 is transmitted directly to the wheel cylinder 70i, so that the vehicle is held immovable. When the brake pedal 73 is released, the pressure in the wheel cylinder 70i is decreased to zero together with the pressure of the master cylinder 72.

In this way, the antiskid control system controls the fluid pressure of the wheel cylinder 70FR, the fluid pressure of the wheel cylinder 70FR, and the fluid pressure of the wheel cylinders 70RR and 70RL, respectively, in accordance with the sensed wheel speeds $Vw_{FL}$, $Vw_{FR}$ and $Vw_R$.

The control system of the first embodiment is operated as follows:

When the key switch is turned on during parking, power is supplied to the controller 25, the abnormality sensor 23 and other components. In this case, the ignition-on signal IG produced by the turn-on of the ignition switch is inputted to the flip-flops 35c and 35d of the fail-safe section 35, so that both flip-flops are reset. Therefore, the switching transistor 35f remains off, and the warning lamp 34a remains extinguished. At the same time, the switching transistor 35g becomes off, and the switching transistor 35h becomes on, so that the solenoid relay 80 is closed by energization of the relay coil, and one terminal of the proportional solenoid 20g of the pressure control valve 20f is connected to the positive power source terminal.

If there is no abnormal condition in the sensors 21FL-21R and 22Y, and the motor 20a and the solenoid 20g of the hydraulic unit 20, then the abnormality signals $RA_1$-$RA_3$, YA, MA, CS and PA produced by the abnormality sensor 23 are all equal to the logical value "0". In response to these zero signals of the abnormality sensor 23, the fail-safe section 35 holds the flip-flops 35c and 35d in the reset state, and delivers the first and second abnormality detection signals $AB_1$ and $AB_2$ which are both held equal to the logical value "0", to the clutch engagement force decreasing section 32 and the analog multiplexer 36.

On the other hand, the antiskid control circuit 63 holds the control signal MR indicating the operating period of the antiskid control, equal to the logical value "0" because the vehicle is in the parking state, and the antiskid control is out of operation.

Therefore, the analog multiplexer 36 selects the output $T_M$ or $T_{EB}$ of the select high switch 38. In this case, the first clutch engagement force $T_M$ determined by the first clutch engagement calculating section 31, and the second clutch engagement force $T_{EB}$ calculated by the second calculating section 33 are both equal to zero, and therefore, the output of the analog multiplexer 36 is zero.

Because the vehicle is still in the parking state, the outputs $n_{FL}$, $n_{FR}$ and $n_R$ of the rotation sensors 21FL, 21FR and 21R are all equal to zero, so that the outputs $Vw_{FL}$, $Vw_{FR}$ and $Vw_R$ of the wheel speed calculating circuits 41FL, 41FR and 41R, and the output DVw of the wheel speed difference calculating circuit 42 are all equal to zero. Consequently, the first clutch engagement force $T_M$ calcoualted by the first clutch engagement calculating circuit 45 becomes equal to zero. On the other hand, the engine is still in the idling state, and the engine speed $V_E$ determined by the engine speed calculating circuit 33a is lower than the predetermined threshold value. Therefore, the second clutch engagement force $T_{EB}$ determined by the second clutch engagement force calculating circuit 33b remains equal to zero, as shown in FIG. 10.

Thus, the first and second clutch engagement force $T_M$ and $T_{EB}$ are both equal to zero, the select high switch 38 selects the zero clutch engagement force $T_M$, for example, and the analog multiplexer 36 selects and delivers the zero clutch engagement force $T_M$ to the output section 37.

In the output section 37, the zero clutch engagement force $T_M$ is inputted through the output filter 37a to the adding circuit 37c. Therefore, the adding circuit 37c delivers only the dither signal of a relatively small amplitude and a high frequency, to the solenoid driver circuit 20k. In response to this dither signal, the solenoid driver circuit 20k drives the proportional solenoid 20g. In this case, the dither signal can cause the spool of the control valve 20f to vibrate minutely, but it cannot cause the output pressure of the control valve to rise. Therefore, the output pressure of the control valve 20f remains zero, the clutch engagement force of the transfer clutch 16 remains zero, and the transfer clutch 16 remains disengaged. Thus, the drive system is held in the rear two-wheel drive state in which the driving torque from the engine 1 is transmitted only to the rear wheels 2RL and 2RR.

When, in this state, the transmission 5 is connected, and the accelerator pedal is depressed to start the vehicle, then the engine speed increases. Therefore, the engine speed calculating circuit 33a of the second clutch engagement calculating section 33 increases its output signal $V_E$ representing the engine speed, and the second clutch engagement force calculating circuit 33b increases the second clutch engagement force $T_{EB}$ dependent on the engine braking amount, linearly with the increase of the engine speed $V_E$, as shown in FIG. 10. If the starting of the vehicle is mild and gradual, and the road is paved and dry so that the friction coefficient is high, there is little or no difference in rotational speed between the rear wheels 2RL and 2RR driven by the engine, and the front wheels 2FL and 2FR which are not being driven. Therefore, in this case, the first clutch engagement calculating section 31 holds the first clutch engagement force $T_M$ approximately equal to zero. Consequently, the select high switch 38 selects the second clutch engagement force $T_{EB}$ which has become greater than $T_M$, the analog multiplexer 36 delivers the second clutch engagement force $T_{EB}$ to the output circuit 37, and the solenoid driver circuit 20k supplies the proportional solenoid 20g of the pressure control valve 20f with the solenoid current Isol corresponding to the second clutch engagement force $T_{EB}$. In response to the solenoid current Isol, the pressure control valve 20f increases the clutch engagement force of the transfer clutch 16 by increasing the control fluid pressure Pc, and the transfer clutch 16 increases the front wheel driving torque DT transmitted to the front wheels, so that the tendency to 4 WD is increased. In this case, the front wheel driving torque DT is increased so that DT remains approximately equal to the half of the engine braking amount. If, therefore, the accelerator pedal is released and the engine braking is activated in this state, the engine braking force is not concentrated on the rear wheels, but it is distributed between the front and rear wheels. In this way, the control system of the first embodiment can prevent an unstable behavior of the vehicle, and maintain the stability and safety of the vehicle by adequately distributing the braking torque produced by the engine between the front and rear axles.

Figure 9:
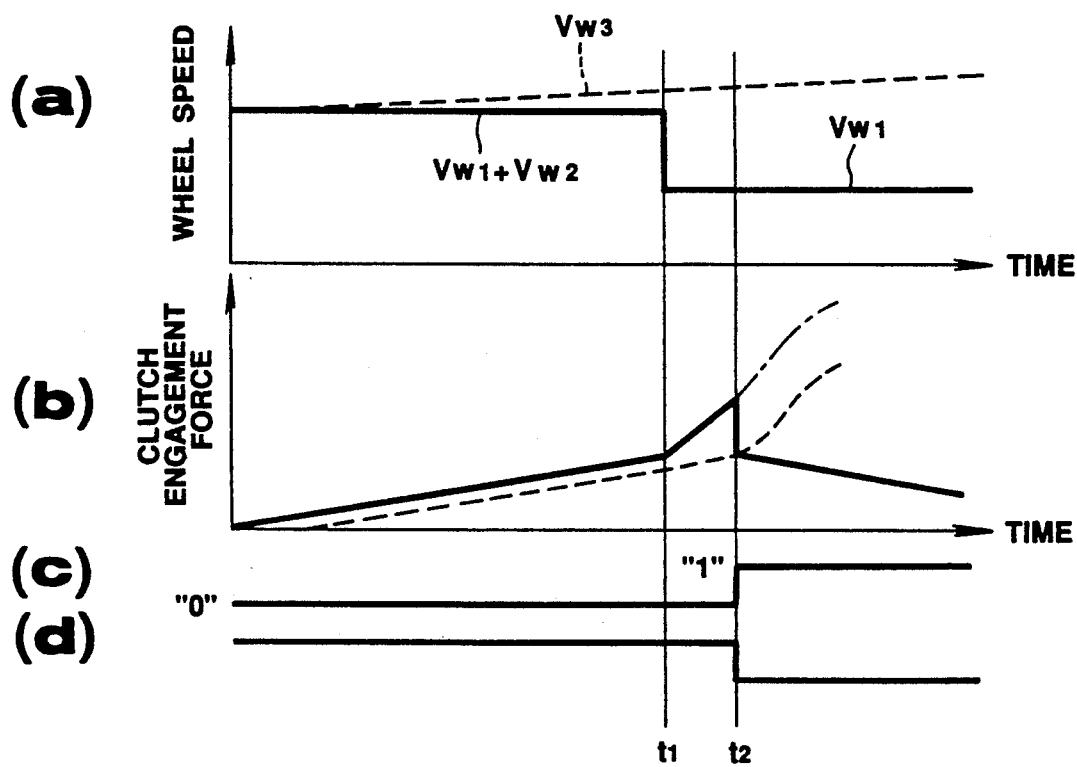
FIG. 9 is a time chart for illustrating operations of the control system according to the first embodiment of the present invention.

If the vehicle is accelerated hastily, or if the friction coefficient of the road surface becomes low because of snow, rain or some other factor, then the primary driving rear wheels 2RL and 2RR start slipping, so that the rear wheel speed becomes higher than the front wheel speed, and the front and rear wheel speed difference DVw determined by the circuit 42 increases from zero, as shown by a graph (a) of FIG. 9. Accordingly, the first clutch engagement calculating circuit 45 increases the first clutch engagement force $T_M$, as shown by a graph (b) in FIG. 9.

When the first clutch engagement $T_M$ is thus increased, and becomes higher than the second clutch engagement force $T_{EB}$, then the select high switch 38 selects the first clutch engagement force $T_M$ instead of $T_{EB}$. Therefore, the output section 37 provides a higher drive voltage, the solenoid drive circuit 20k increases the solenoid current Isol supplied to the proportional solenoid 20g by increasing the collector-emitter current of the power transistor 201, the pressure control valve 20f increases the clutch engagement force of the transfer clutch 16 by increasing the control pressure, and the transfer clutch 16 increases the front wheel driving torque DT. In this way, the control system of this embodiment increases the tendency to 4 WD, and ensures the stability of the vehicle even in unsafe situations.

When the vehicle is brought from such a straight ahead operation in the 4 WD mode, to a cornering operation with a relatively large steering angle, then the turning movement of the vehicle produces the lateral acceleration $Y_G$, which is sensed by the lateral acceleration sensor 22Y. The sensed lateral acceleration $Y_G$ is inputted through the input filter 43 to the gain calculating circuit 44, which determines the gain K by using the equation $K = a/Y_G$ where a is a constant. Thus, the gain calculating circuit 44 decreases the gain K as the latral acceleration $Y_G$ increases.

The thus-decreased gain K is inputted to the first clutch engagement force calculating circuit 45, and used to determine the first clutch engagement force $T_M$ ($=K \times |DVw|$). Therefore, the first clutch engagement force calculating circuit 45 decreases the first clutch engagement force $T_M$, the solenoid drive circuit 20k decreases the solenoid current Isol, the pressure control valve 20f decreases the clutch engagement force of the transfer clutch 16, the transfer clutch 16 decreases the ratio of the front wheel driving torque to the total driving force and increases the ratio of the rear wheel driving torque, and the oversteering tendency of the vehicle is increased.

When the accelerator pedal is released, and the brake pedal is depressed to retard the vehicle hastily, then the antiskid control section 29 comes into operation, and controls the braking forces of the wheel cylinders 70FL–70RR of the four wheels 2FL-2RR, individually.

In this case, the engine braking is activated with the release of the accelerator pedal, and the control system of this embodiment distributes the braking force properly between the front and rear wheels in the following manner. Even if the first clutch engagement force $T_M$ is zero, the second clutch engagement force calculating section 33 yields the second clutch engagement force $T_{EB}$ which is increased in accordance with the engine speed so that the change in $T_{EB}$ is directly proportional to the change in the engine speed $V_E$, and which corresponds to about a half of the engine braking amount.

This second clutch engagement force $T_{EB}$ is delivered to the output circuit 37 through the select high switch 38 and the analog multiplexer 36, and the clutch engagement force of the transfer clutch 16 is controlled to be equal to $T_{EB}$. In this way, the control system of this embodiment holds the clutch engagement force of the transfer clutch 16 equal to at least about half of the engine braking force, and transmits, to the front wheels, the torque DT so that the engine braking force is adequately distributed between the front and rear wheels and the stability of the vehicle is improved.

If, for example, the rotation sensor 21FR becomes unable to produce the induced voltage because of occurrence of an abnormal condition at an instant $t_1$ shown in FIG. 9, then the wheel speed difference DVw outputted from the circuit 42 increases, and the first clutch engagement force $T_M$ of the circuit 45 is increased as shown by a solid line at (b) in FIG. 9.

On the other hand, the rotation sensor abnormality detection circuit 23a of the abnormality sensor 23 detects this failure of the rotation sensor 21FR, and delivers, after 0.5 sec, the abnormality signal $RA_1$ of the logical value "1", to the fail-safe section 35. In the fail-safe section 35, the OR circuit 35a sets the flip-flop 35c by sending the "1" output to the set terminal, and accordingly the flip-flop 35c lights the warning lamp 34a to attract driver's attention to the abnormal condition by turning on the switchig transistor 35f, and at the same time sends the first abnormality detection signal $AB_1$ to the clutch engagement force decreasing section 32 and the analog multiplexer 36.

Therefore, the analog multiplexer 36 selects the fail-safe clutch engagement force $T_{FS}$ determined by the decreasing section 23, and supplies the signal representing $T_{FS}$ to the solenoid driver circuit 20k through the output circuit 37, and the pressure control valve 20f varies the clutch engagement force of the transfer clutch 16 in accordance with $T_{FS}$.

In this case, the clutch engagement force decreasing section 23, in response to the first abnormality detection signal $AB_1$, holds the field-effect transistor 52 in the on state during the predetermined interval set by the one-shot multivibrator 51, and charges the capacitor 53 with an analog voltage corresponding to an old value of the first clutch engagement force $T_M$ which was determined by the first clutch engagement force calcuting section 31, 0.5 second ago, at the instant at which the abnormality sensor 23 detected the abnormality in the rotation sensor 21FR, and which was stored into the shift register 47 through the select high switch 38 and the A/D converter 46.

On the other hand, the field-effect transistor 55 provided in the integrating circuit 56 is turned off, as shown at (d) in FIG. 9 because of the change of the first abnormality detection signal $AB_1$ to the logical value "1". Accordingly, the integrating circuit 56 initiates the integration by using the predetermined voltage B as an initial value, and supplies the adder 57 with the integral output increasing in the negative direction with time.

Therefore, after the instant $t_2$, the adder 57 outputs the fail-safe clutch engagement force $T_{FS}$ which is the result of subtraction of the output of the integrating circuit 56 from the old value of the clutch engagement force $T_M$ stored in the capacitor 53 and which decreases gradually with time as shown by the solid line at (b) in FIG. 9.

The thus-determined fail-safe clutch engagement force $T_{FS}$ is transmitted through the analog multiplexer 36, and the output circuit 37 to the solenoid 20g of the pressure control valve 20f. Therefore, the control valve 20f gradually decreases the clutch engagement force of the transfer clutch 16 by gradually decreasing the output fluid pressure, and gradually decreases the driving force distribution ratio of the front wheels. In the way, the control system of this embodiment gradually changes the drive system from the 4 WD state toward the 2 WD state if an abnormality is detected. Therefore, the control system can prevent a spin of the vehicle due to decrease in the rear wheel cornering force, prevent an abrupt change in vehicle behavior, and improve the safety of the vehicle.

When the abnormality signal is produced by one or more of the other rotation sensor abnormality detection circuits, the lateral acceleration abnormality detection circuit 23b, the motor abnormality detection circuit 23c and the broken connection detection circuit 23d, the control system of this embodiment controls the clutch engagement force of the transfer clutch 16 in accordance with the fail-safe clutch engagement force $T_{FS}$ of the decreasing section 32 in the same manner.

If the solenoid 20g of the pressure control valve 20f is short-circuited, the short detection circuit 23e of the solenoid abnormality detection circuit 23g delivers the short detection signal SS of the logical value "1", to the fail-safe section 35. In response to this short detection signal SS, the OR circuit 35b makes its output equal to the logical value "1", and brings the flip-flop 35d to the set state. The flip-flop 35d, therefore, causes the warning lamp 34a to be lighted, and brings the solenoid relay 80 to the off state by turning on the switching transistor 35g and turning off the switching transistor 35h. The solenoid relay 80 in the off state disconnects the solenoid 20g of the pressure control valve 20f from the power source. At the same time, the flip-flop 35d causes the analog multiplexer 36 to select the zero clutch engagement force $T_0$ of the circuit 36a by sending the second abnormality detection signal AB$_2$ to the analog multiplexer 36.

When, therefore, a shoft-circuit is detected in the solenoid 20g, the control system of this embodiment decreases the clutch engagement force of the transfer clutch 16 to zero by immediately decreasing the output pressure of the control valve 20f to zero, and immediately changes the drive system from the 4 WD state to the 2 WD state, in order to prevent damage of the solenoid 20g due to excessive heat produced by excessive current.

If an abnormal current flows through the solenoid 20g, the abnormality detection circuit 23f delivers the abnormality signal PA of the logical value "1" to the OR circuit 35b of the fail-safe section 35. Therefore, in this case, too, the flip-flop 35d is set, and the fail-section 35 cuts off the power supply to the solenoid 20g and immediately changes the drive system to the 2 WD state in the same manner.

The control system of the first embodiment normally holds the engagement force of the transfer clutch 16 equal to or greater than the value corresponding to about the half of the engine braking amount, and by so doing, ensures the stability of the vehicle by properly distributing the engine braking torque between the front and rear axles.

Figure 14:
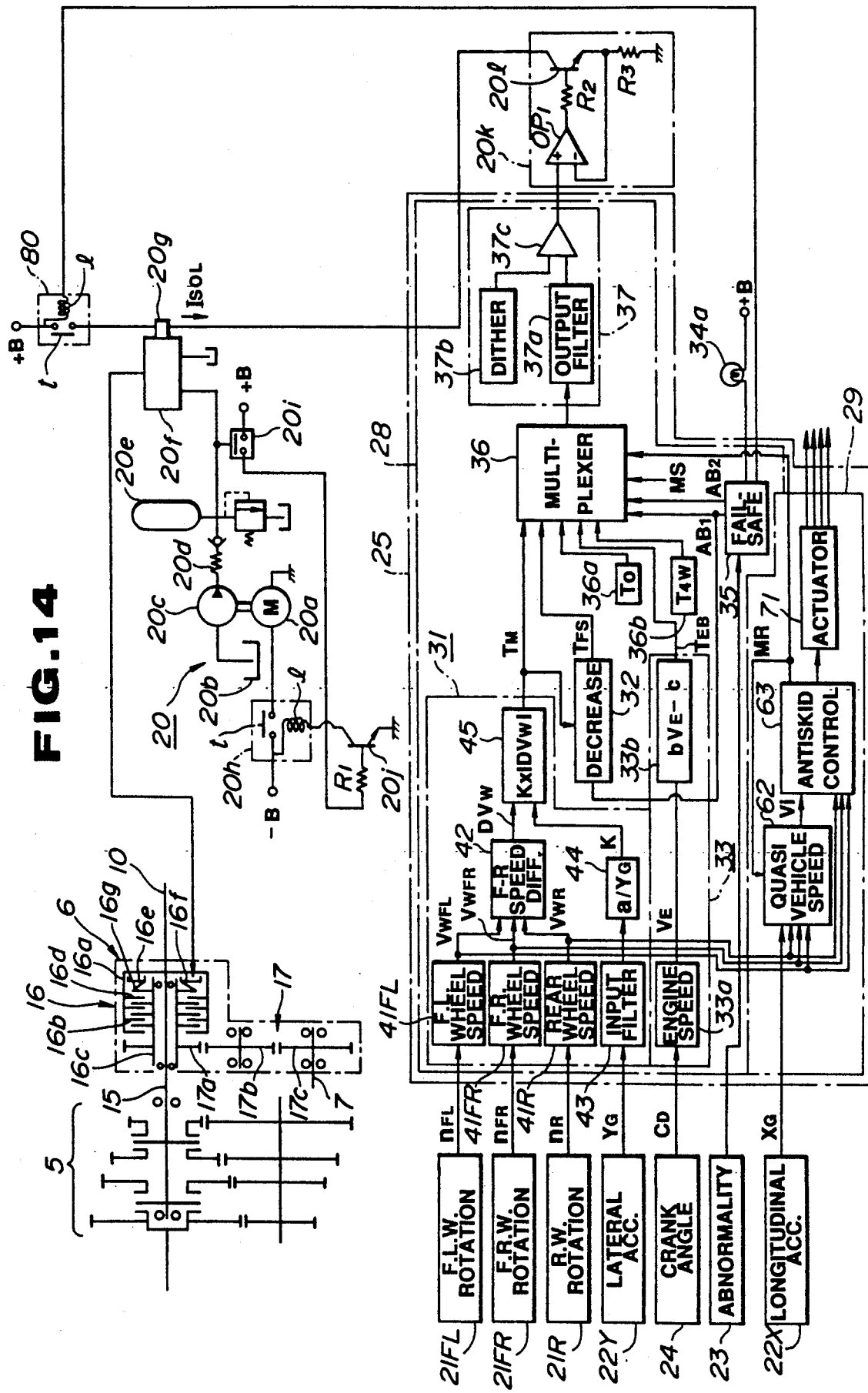
FIG. 14 is a schematic view showing a controller of a second embodiment of the present invention, and other components associated with the controller.

A second embodiment of the present invention is shown in FIG. 14. The control system of the second embodiment is arranged to control the transfer clutch engagement force to be equal to a value corresponding to the engine braking amount when the brakes are applied and the antiskid control is initiated.

In the control system of the second embodiment, the select high switch 38 is omitted, and the first and second clutch engagement force $T_M$ and $T_{EB}$ of the first and second clutch engagement force calculating sections 31 and 33 are inputted into the analog multiplexer 36 directly and individually. Furthermore, the first clutch engagement force $T_M$ of the first section 31 is inputted to the clutch engagement force decreasing section 32, and the control signal MR is sent from the antiskid control section 29 to the multiplexer 36. The analog multiplexer 36 of the second embodiment is adapted to select the first clutch engagement force $T_M$ when the first and second abnormality detection signals AB$_1$ and AB$_2$, the manual selection signal MS and the control signal MR of the antiskid control section 29 are all equal to "0"; the second clutch engagement force $T_{EB}$ when the first and second abnormality detection signals AB$_1$ and AB$_2$ are both "0" and the antiskid control signal MR is "1"; the fail-safe clutch engagement force $T_{FS}$ of the decreasing section 32 when the first abnormality detection signal AB$_1$ is "1"; the zero clutch engagement force $T_0$ of the circuit 36a when the second abnormality detection signal AB$_2$ is "1"; and the maximum clutch engagement force $T_{4w}$ of the circuit 36b when the manual selection signal MS is "1". In the remaining points, the control system of the second embodiment is substantially identical to the control system of the first embodiment.

When the accelerator pedal is released, and the brake pedal is depressed during movement of the vehicle, the antiskid control section 29 is put into operation, and delivers the antiskid control signal MR of the logical value "1" to the analog multiplexer 36.

In response to this control signal MR from the antiskid control section 29, the analog multiplexer 36 selects the second clutch engagement force $T_{EB}$ instead of the first clutch enagement force $T_M$, and the driving force distribution control section 28 controls the exciting current of the solenoid 20g in accordance with the second clutch engagement force $T_{EB}$. In this case, the engine speed calculating circuit 33a determines the engine speed $V_E$ from the output signal of the crank angle sensor 24, and the second clutch engagement force calculating circuit 33b determines the relatively small second clutch engagement force $T_{EB}$ corresponding to about the half of the amount of the braking action of the engine by using the equation (3). The thus-determined second clutch engagement force $T_{EB}$ is sent through the analog multiplexer 36 and the output circuit 37 to the solenoid 20g of the pressure control valve 20f.

In this way, the control system of the second embodiment employs the second clutch engagement force $T_{EB}$ dependent on the engine speed during the antiskid control, and distributes the engine braking torque between the front and rear wheels, so that spin of the vehicle is prevented, and the stability of the vehicle is maintained. In this case, the second clutch engagement force $T_{EB}$ corresponding to about the half of the engine braking amount is sufficiently low with respect to the braking torque produced during the antiskid control, so that the front wheel speed $V_{wF}$ and the rear wheel speed $V_{wR}$ are not synchronized but held asynchronous, and besides, both wheel speeds are decreased. Therefore, this control system can ensure a proper performance of the antiskid control.

Figure 15:
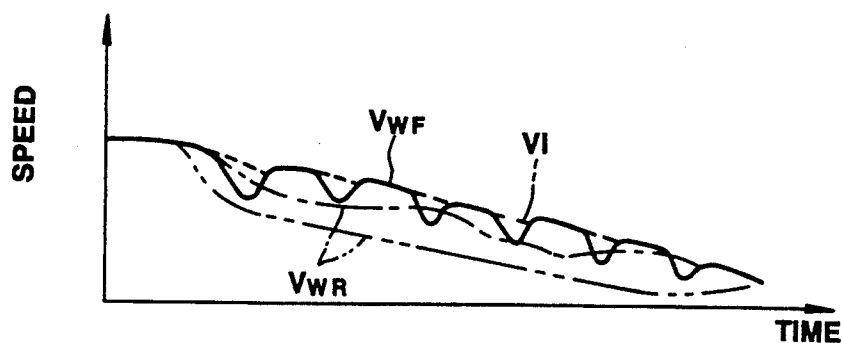
FIG. 15 is a graph for illustrating operations of the control system of the second embodiment.

In the conventional control system as contrasted with the control system of this embodiment, the drive system is put in the 2 WD state during the antiskid control, and all the engine braking amount is applied to the rear wheels. Therefore, the rear wheel speed $V_{WR}$ varies along a curve of a two dot chain line in FIG. 15 which is determined by the balance between the engine braking amount and the torque of the road surface, and which is considerably apart from the front wheel speed $V_{WF}$, so that the behavior of the vehicle becomes unstable especially when the antiskid control is in operation during high speed driving on a slippery road of a low friction coefficient.

In the second embodiment, the clutch engagement force dependent on the engine braking amount is selected during the antiskid brake control. However, it is optional to employ a means for sensing a decelerating condition of the vehicle, such as an accelerator switch for sensing release of the accelerator pedal, or a brake switch for sensing depression of the brake pedal, or a means for sensing the decelerating condition from the vehicle speed sensed by the vehicle speed sensor. In this case, the control system controls the clutch engagement force of the transfer clutch in accordance with the second clutch engagment force $T_{EB}$ dependent on the engine braking amount when the accelerator pedal is released, or when the brake pedal is depressed, or when the vehicle speed is decreasing.

In the first and second embodiments, the engine braking amount is estimated by using the crank angle sensor 24 and the engine speed calculating circuit 33a for calculating the engine speed $V_E$. However, it is possible in the present invention to employ an accelerator opening degree, or a transmission gear ratio, or a combination of the engine speed and transmission gear ratio, or the vehicle speed, in place of the engine speed.

Figure 16:
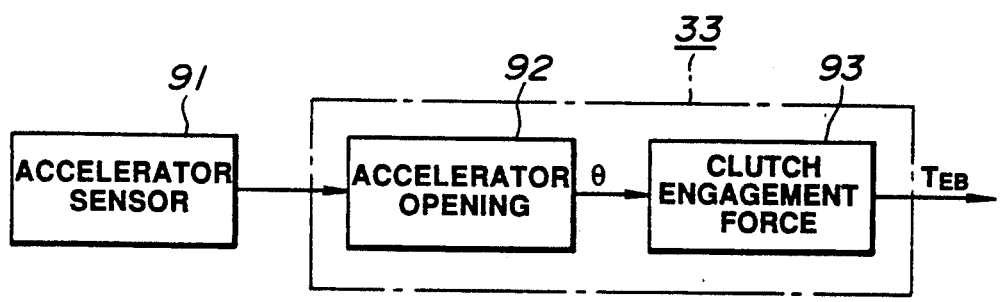
FIG. 16 is a block diagram showing another example of a second clutch engagement force determining section 33 used in the preceding embodiments.
Figure 17:
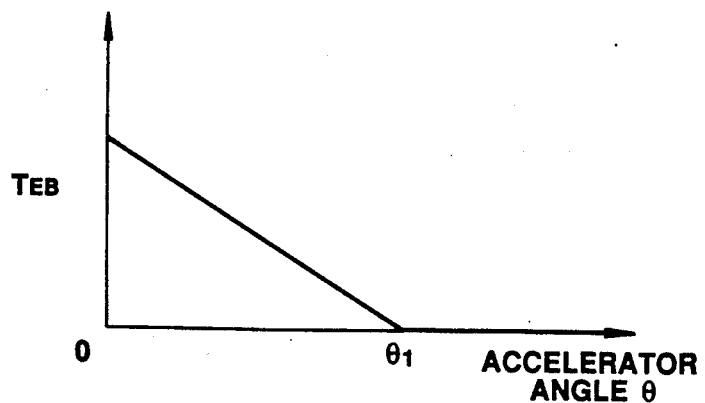
FIG. 17 is a graph showing a relationship, used in the example shown in FIG. 16, of the clutch engagement force $T_{EB}$ with respect to an accelerator position.

FIG. 16 shows an arrangement which employs the accelerator opening degree as a parameter for estimating the engine braking amount. In this arrangement, an accelerator sensor 91 is substituted for the crank angle sensor 24 used in the first and second embodiment, and the combination of an acceleration opening degree calculating circuit 92 and a second clutch engagement force calculating circuit 93 is substituted for the second clutch engagement force calculating section 33 of the first and second embodiment. The accelerator sensor 91 senses the accelerator opening degree (or the throttle opening degree of the throttle valve of the engine) by sensing the depression degree of the accelerator pedal, or the position of the throttle valve, or the position of some other movable element of the accelerator system of the vehicle. The calculating circuit 92 calculates the accelerator opening $\theta$ by using the output signal of the accelerator sensor 91, and the second clutch engagement force calculating circuit 93 calculates the second clutch engagement force $T_{EB}$ in accordance with the accelerator opening degree $\theta$. The engine braking amount is inversely proportional to the accelerator opening degree. Therefore, the circuit 93 determines the second clutch engagement force $T_{EB}$ by using the following equation (5), and decreases the second clutch engagement force $T_{EB}$ linearly with 20 increase in the accelerator opening degree $\theta$, as shown in FIG. 17.

$$T_{EB} = -b\theta + b\theta_1 \quad\quad\quad\quad\quad (5)$$

Figure 18:
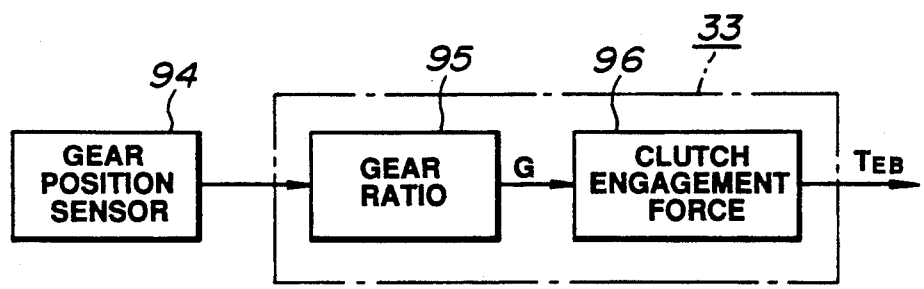
FIG. 18 is a block diagram showing still another example of the second clutch engagement force determining section 33.

FIG. 18 shows an arrangement for employing the transmission gear ratio. The engine braking amount is proportional to the gear ratio G of the transmission 5. Therefore, in the arrangement shown in FIG. 18, a gear position sensor 94 senses the gear position of the transmission 5, a calculating circuit 95 calculates the gear ratio G by using the output signal of the gear position sensor 94, and a clutch engagement force calcualting circuit 96 determines the second clutch engagement force $T_{EB}$ in accordance with the gear ratio G. In this example, the circuit 96 is arranged to determine the second clutch engagement force $T_{EB}$ by multiplying a half of a predetermined value $T_S$ (8 kgm, for example) by the transmission gear ratio G.

Therefore, $T_{EB} = T_S \times \frac{1}{2} \times G$.

The arrangement shown in FIG. 18 can be used in place of the combination of the cranks angle sensor 24, and the circuits 33a and 33b in the control system of the first or second embodiment.

Furthermore, it is optional to hold the second clutch engagement force $T_{EB}$ fixedly equal to the half of the predetermined value $T_S$. In this case, the adequate distribution of the engine braking force is ensured at least in the fourth speed of the transmission since the gear ratio of the fourth speed is equal to one.

Figure 19:
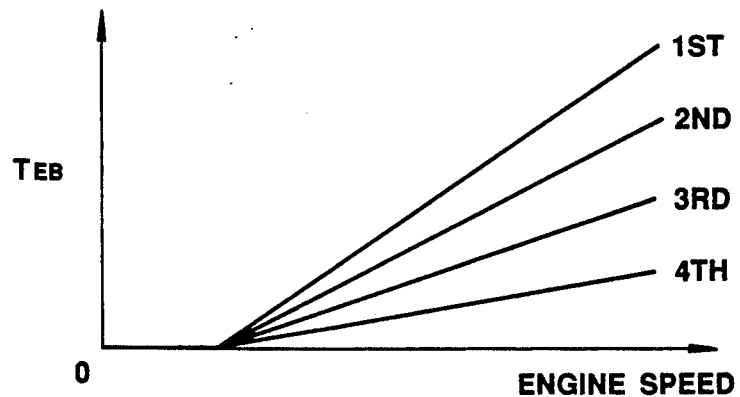
FIG. 19 is a graph showing a relationship, used in the present invention, between the clutch engagement force $T_{EB}$ and the engine speed, taking a transmission gear position as a parameter.

In an example shown in FIG. 19, the second clutch engagement force $T_{EB}$ is determined in accordance with the engine speed and the gear ratio. As shown in FIG. 19, the second clutch engagement force $T_{EB}$ is constantly equal to zero when the engine speed is lower than a predetermined threshold value, and is increased along a straight line with increase in the engine speed when the engine speed is higher than the threshold value. The slope of the straight line is varied in accordance with the gear ratio so that the line becomes more and more gradual in the order of the first, second, third and fourth speeds. The example of FIG. 19 requires the gear position sensor 94, and the gear ratio calculating circuit 95 in addition to the crank angle sensor 24 and the engine speed calculating circuit 33a.

Figure 20:
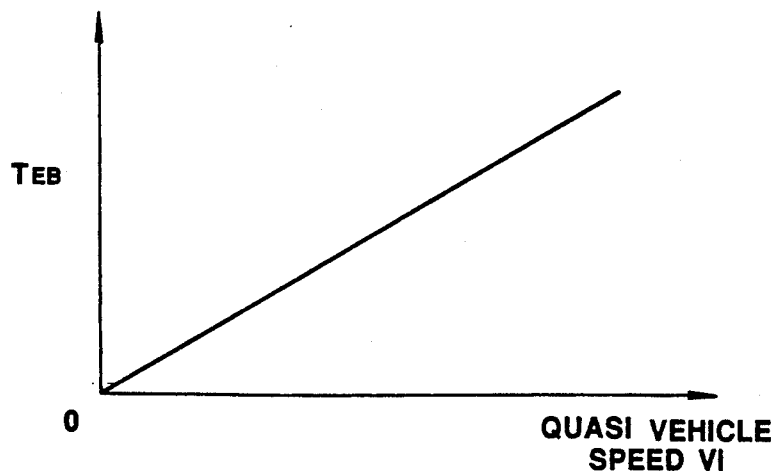
FIG. 20 is a graph showing a relationship between the clutch engagement force $T_{EB}$ and the quasi vehicle speed, which can be used in the present invention.

In an example shown in FIG. 20, the second clutch engagement force $T_{EB}$ is proportional to the quasi vehicle speed $V_i$ determined by the quasi vehicle speed determining circuit 62. In this case, the second clutch engagement calculating section 33 is connected with the quasi vehicle speed calculating section 62, and determines $T_{EB}$ by multiplying $V_i$ by a predetermined constant.

The present invention is applicable not only to a vehicle in which the rear wheels are the primary driving wheels, but it is also applicable to a vehicle in which the front wheels are the primary driving wheels. When the front wheels are primary and always connected with the output shaft of the transmission, the front and rear wheel speed difference DV is determined according to;

$$DV = 2V_{wF} - V_{wRL} - V_{wRR}$$

In the present invention, an electromagnetic clutch or a clutch of any other type can be used as the transfer clutch 16 as long as it can continuously vary a torque transmitted through itself.

It is possible to arrange the hydraulic unit modify 20 in various manners. For example, the oil pump 20c may be driven by the engine 1 instead of the electrical motor. The pressure control valve 20f may be replaced by a pressure reducing valve, a relief valve, or some other control valve which can be controlled electrically and which can control the fluid pressure continuously.

The controller 25 of the present invention may be constructed in various manners. The controller 25 may be in the form of a combination of electronic circuits, or one or more microcomputers. The driving force distribution control section 28 and the antiskid control section 29 need not be an integral unit but they may be two separate units.

What is claimed is:

1. A driving force distribution control system for a vehicle, comprising;
   actuator means for varying a driving force distribution ratio of a driving force transmitted from an engine of said vehicle to secondary driving wheels of said vehicle to a driving force transmitted from said engine to primary driving wheels of said vehicle, in accordance with a driving force distribution control signal,
   means for estimating an amount of engine braking applied on said vehicle, and
   controller means for controlling said driving force distribution ratio by producing said control signal in accordance with said amount of engine braking estimated by said estimating means.

2. A control system according to claim 1 wherein said control system further comprises means for sensing a decelerating condition of said vehicle, and said controlling means produces said control signal in accordance with said amount of engine braking when said decelerating condition is sensed.

3. A control system according to claim 1 wherein said controller means comprises first controlling means for controlling said driving force distribution ratio continuously in accordance with a first operating condition of said vehicle, and second controlling means for controlling said driving force distribution ratio at such a level as to cause a braking force produced by said engine of said vehicle to be distributed between said primary and secondary driving wheels, and to allow said primary and secondary driving wheels to rotate at different speeds.

4. A control system according to claim 3 wherein said controller means further comprises selecting means for receiving a first control signal produced by said first controlling means and a second control signal produced by said second controlling means, and outputting only one of said first and second control signals.

5. A control system according to claim 4 wherein said selecting means normally outputs said first control signal, and outputs said second control signal to prevent the braking force produced by said engine from being transmitted only to said primary driving wheels.

6. A control system according to claim 4 wherein said first controlling means is connected with first sensor means for sensing said first operating condition, and said second controlling means is connected with second sensor means for sensing a second operating condition of said vehicle which affects said amount of engine braking of said engine.

7. A control system according to claim 6 wherein said second sensor means is means for sensing said second operating condition which is one of an engine speed of said engine, an accelerator position of said engine, a gear ratio of a transmission of said vehicle, and a vehicle speed.

8. A control system according to claim 7 wherein said second sensor means comprises means for sensing said engine speed, and said second controlling means increases said second control signal as said engine speed increases.

9. A control system according to claim 8 wherein said second controlling means holds said second control signal equal to zero when said engine speed is lower than a predetermined speed value, and increases linearly with increase in said engine speed when said engine speed is higher than said predetermined speed value.

10. A control system according to claim 9 wherein said second sensor means further comprises means for sensing said gear ratio of said transmission, and said second controlling means increases said second control signal with increase in said engine speed above said predetermined speed value at a rate of increase which is increased as said gear ratio increases.

11. A control system according to claim 7 wherein said second sensor means comprises means for a throttle opening degree of said engine by sensing a position of a movable member of an accelerating system of said engine, and said second controlling means decreases said second control signal from a predetermined maximum value to zero as said throttle opening increases from zero.

12. A control system according to claim 7 wherein said second sensor means comprises means for sensing said gear ratio of said transmission, and said second control means sets said second control signal equal to a product obtained by multiplying a predetermined constant value by said gear ratio.

13. A control system according to claim 7 wherein said second sensor means comprises means for estimating said vehicle speed of said vehicle, and said second controlling means increases said second control signal in proportion to said vehicle speed.

14. A control system according to claim 6 wherein said selecting means selects said second control signal when said first control signal is lower than said second control signal.

15. A control system according to claim 6 wherein said control system further comprises means for sensing a decelerating condition of said vehicle, and said selecting means selects said second control signal when said decelerating condition is sensed.

16. A control system according to claim 6 wherein said control system further comprises antiskid brake control means for controlling a brake system of said vehicle.

17. A control system according to claim 16 wherein said selecting means selects said second control signal when said antiskid means is in operation.

18. A control system according to claim 6 wherein said first sensor means comprises means for determining a wheel speed difference which is a difference obtained by subtracting a wheel speed of said secondary wheels from a wheel speed of said primary wheels, and said first controlling means continuously increases said first control signal in accordance with said speed difference.

19. A control system according to claim 18 wherein said first sensor means comprises means for sensing a lateral acceleration of said vehicle, and said first controlling means decreases said first control signal as said lateral acceleration increases.

20. A control system according to claim 6 wherein said primary driving wheels are rear wheels of said vehicle, and said secondary driving wheels are front wheels of said vehicle, and said actuator means comprises a transfer clutch which can break a driving connection between said engine and said secondary driving wheels without breaking a driving connection between said engine and said primary driving wheels and which can vary an engagement force continuously.

* * * * *